US012535603B2

(12) United States Patent
Fujii

(10) Patent No.: US 12,535,603 B2
(45) Date of Patent: Jan. 27, 2026

(54) RADIATION IMAGE SCANNER

(71) Applicant: J. MORITA MFG. CORP., Kyoto (JP)

(72) Inventor: Yusuke Fujii, Kyoto (JP)

(73) Assignee: J. MORITA MFG. CORP., Kyoto (JP)

( * ) Notice: Subject to any disclaimer, the term of this patent is extended or adjusted under 35 U.S.C. 154(b) by 267 days.

(21) Appl. No.: 18/178,155

(22) Filed: Mar. 3, 2023

(65) Prior Publication Data

US 2023/0280480 A1 Sep. 7, 2023

(30) Foreign Application Priority Data

Mar. 4, 2022 (JP) ................................ 2022-033323

(51) Int. Cl.

*G01T 1/20* (2006.01)
*G01T 1/166* (2006.01)
*G01T 1/24* (2006.01)

(52) U.S. Cl.

CPC .......... *G01T 1/2014* (2013.01); *G01T 1/1663* (2013.01); *G01T 1/248* (2013.01)

(58) Field of Classification Search

None
See application file for complete search history.

(56) References Cited

U.S. PATENT DOCUMENTS

| | | | |
|---|---|---|---|
| 4,945,238 | A | 7/1990 | Muraishi |
| 6,572,095 | B1 | 6/2003 | Katou et al. |
| 7,180,085 | B2 | 2/2007 | Otokuni |
| 2003/0058485 | A1 | 3/2003 | Otokuni |
| 2012/0002276 | A1 | 1/2012 | Suzuki et al. |

FOREIGN PATENT DOCUMENTS

| | | | | |
|---|---|---|---|---|
| EP | 0 098 574 | A2 | | 1/1984 |
| EP | 1 826 610 | A1 | | 8/2007 |
| JP | 4-240843 | | | 8/1992 |
| JP | H04240843 | | * | 8/1992 |
| JP | 5-8558 | U | | 2/1993 |

(Continued)

OTHER PUBLICATIONS

Extended European Search Report issued Jul. 13, 2023, in Patent Application No. 23159364.1, 9 pages.

(Continued)

*Primary Examiner* — Edwin C Gunberg
(74) *Attorney, Agent, or Firm* — Oblon, McClelland, Maier & Neustadt, L.L.P.

(57) ABSTRACT

A radiation image scanner that reads a radiation image from an imaging plate, the radiation image scanner including: a stage that holds the imaging plate; an excitation light source that irradiates the imaging plate held by the stage with excitation light; and a photodetector that detects light emitted from the imaging plate by the excitation light, in which the stage includes: a stage body that includes a supporting surface capable of being brought into surface contact with a back surface of the imaging plate; and a positioning mechanism that includes a positioning surface being in contact with an edge portion of the imaging plate supported on the supporting surface and positioning the edge portion from outside along the supporting surface while pressing the edge portion against the supporting surface.

20 Claims, 17 Drawing Sheets

(56) References Cited

FOREIGN PATENT DOCUMENTS

| | | | |
|---|---|---|---|
| JP | 7-5599 | A | 1/1995 |
| JP | 10-221254 | A | 8/1998 |
| JP | 2001-75204 | A | 3/2001 |
| JP | 2003-172979 | A | 6/2003 |
| JP | 2004-86201 | A | 3/2004 |
| JP | 4073696 | B2 | 4/2008 |
| JP | 2011-53459 | A | 3/2011 |
| JP | 2012-13952 | A | 1/2012 |
| WO | WO 2006/064648 | A1 | 6/2006 |
| WO | WO-2014/103423 | A1 | 7/2014 |

OTHER PUBLICATIONS

Japanese Office Action issued Mar. 5, 2024 in Japanese Patent Application No. 2022-033323 (with unedited computer-generated English translation), 8 pages.
European Office Action issued Jun. 2, 2025 in European Patent Application No. 23159364.1, 5 pages.
Japanese Office Action issued Feb. 12, 2025 in Japanese Patent Application No. 2024-069589 (with unedited computer-generated English translation), 4 pages.

* cited by examiner

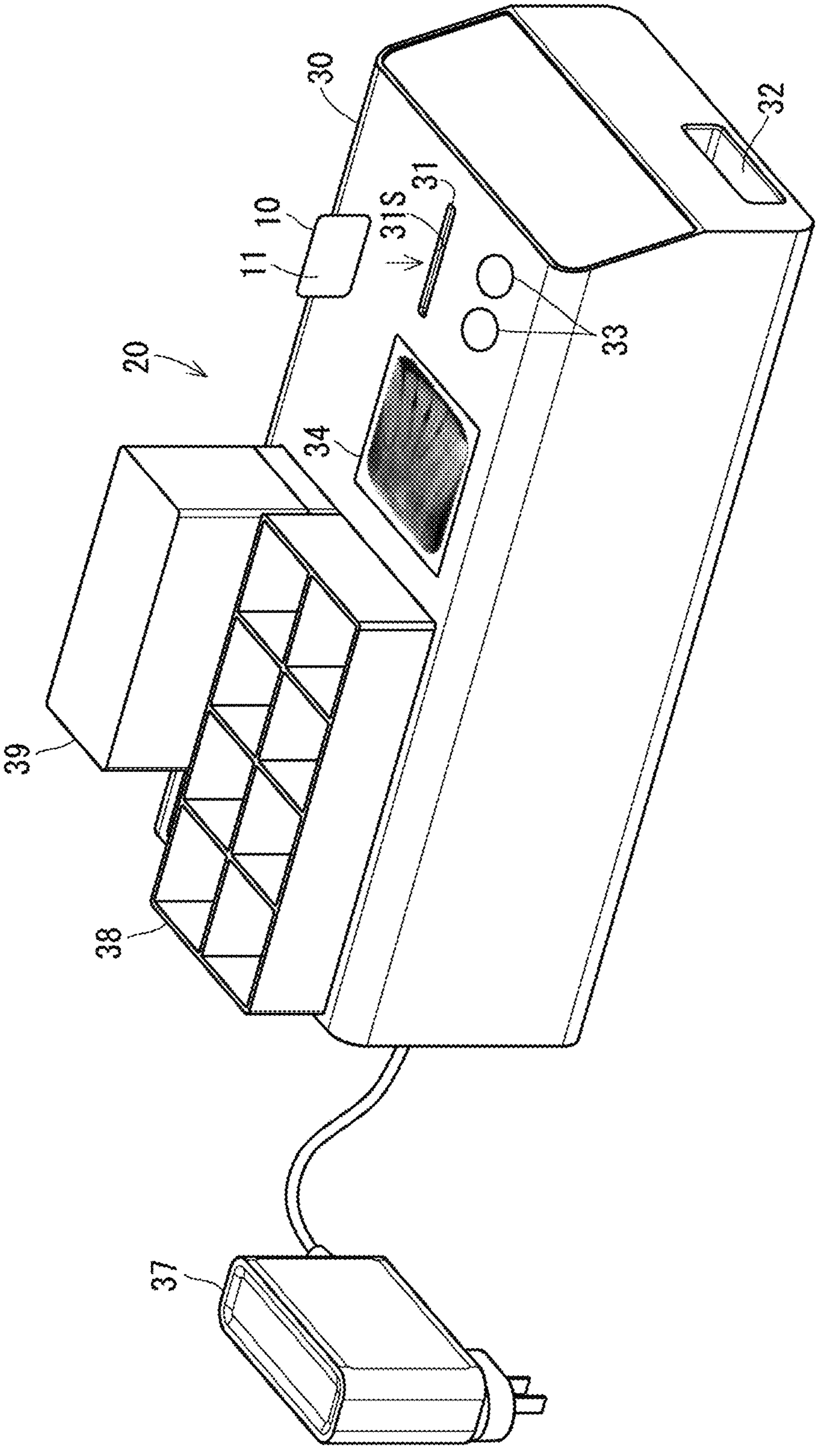
F I G. 1

F I G. 2
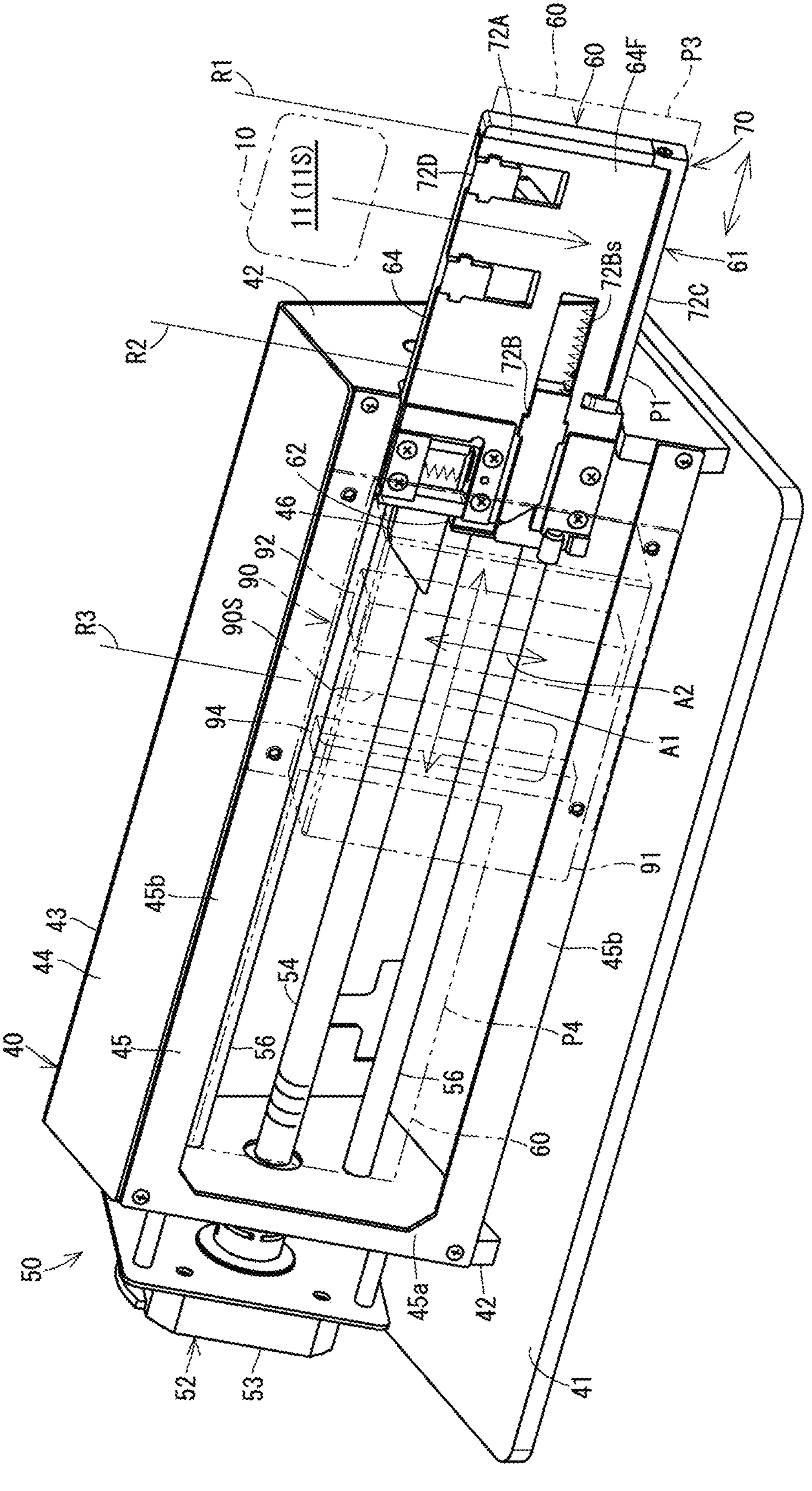

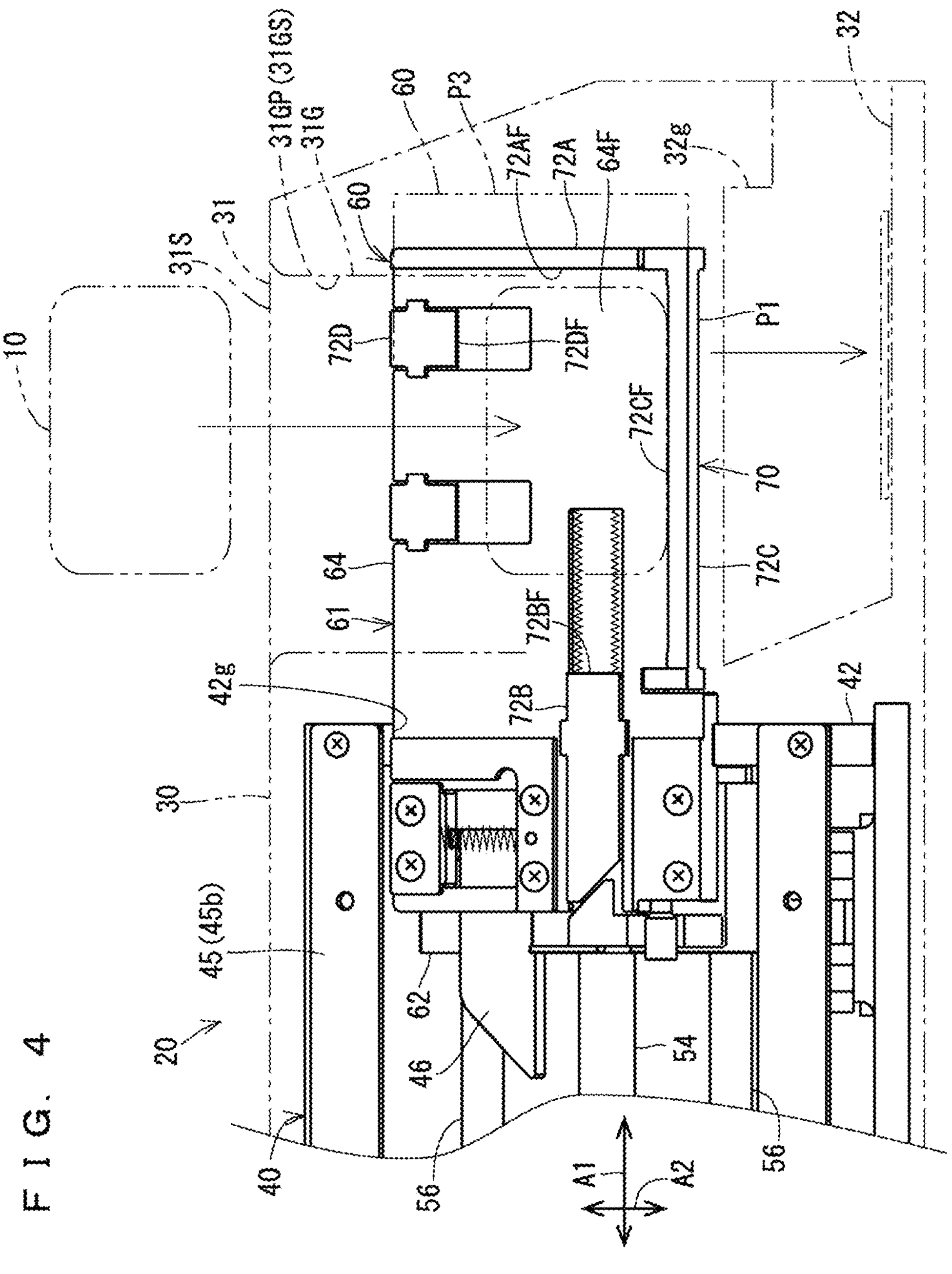
F I G. 4

F I G. 6
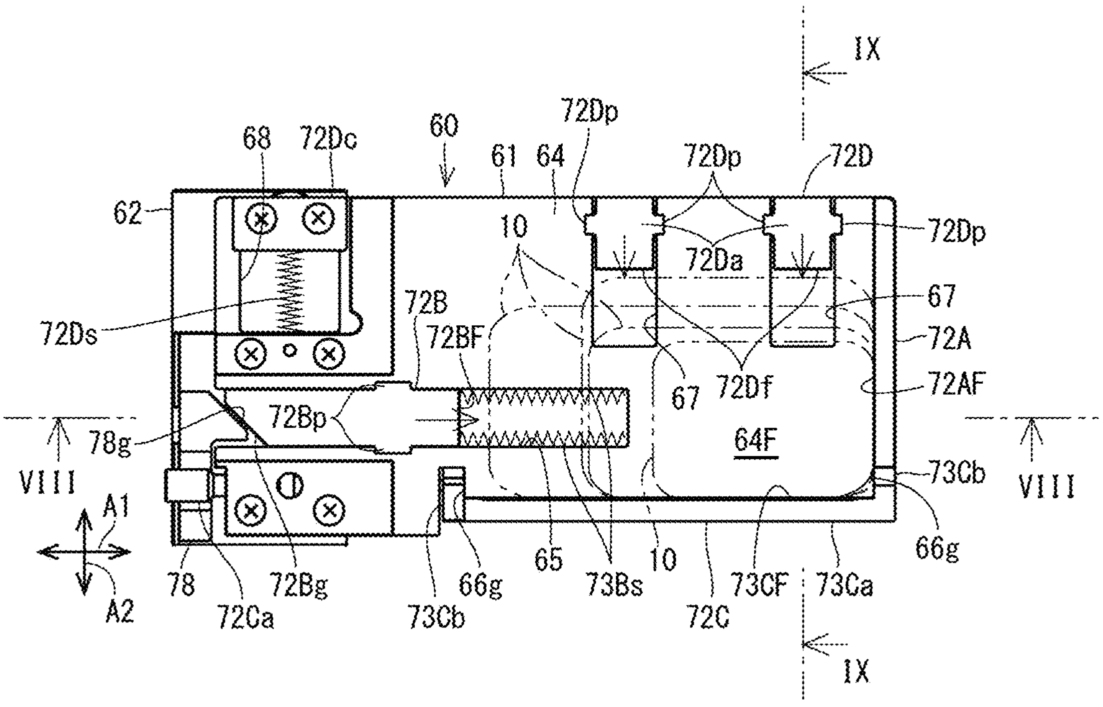

F I G. 1 2
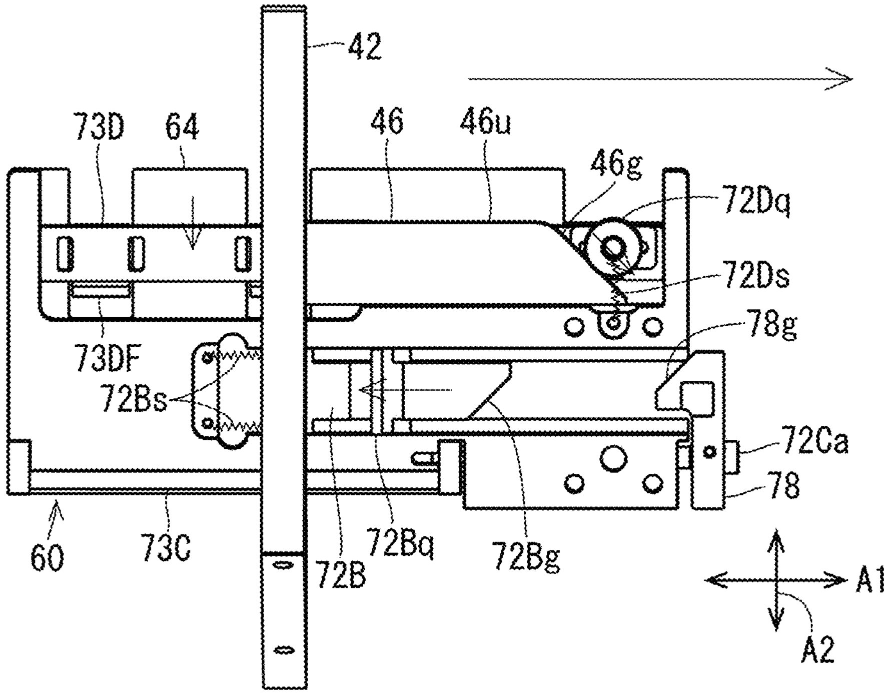

RADIATION IMAGE SCANNER

BACKGROUND OF THE DISCLOSURE

Field of the Disclosure

The present disclosure relates to a radiation image scanner.

Description of the Background Art

Japanese Patent Publication No. 2011-53459 discloses a radiation image reading device including a conveyance mechanism that conveys an imaging plate. The conveyance mechanism including a belt that holds an imaging plate and a belt drive mechanism that rotates the belt is disclosed as an example. The imaging plate is conveyed while placed on a holding surface that is a part of the belt.

In the configuration in which the imaging plate is placed on the holding surface of the belt as in Japanese Patent Publication No. 2011-53459, there is a possibility that the imaging plate is held in a posture inclined from a normal posture suitable for reading the radiation image. In addition, there is a possibility that a part of the imaging plate is held while separated from the holding surface due to warpage of the imaging plate or the like. In addition to Japanese Patent Publication No. 2011-53459, there is a device having a configuration in which the imaging plate partially provided with a magnetic member is held on the holding surface by magnetic force of a magnet. However, in a case where the imaging plate is located at a position where the magnetic force does not reach, there is a possibility that the imaging plate falls off from the holding surface or is held in the state not in the normal posture, so that the latent image of the imaging plate cannot be correctly read.

SUMMARY

An object is to hold the imaging plate that is in a normal posture while being in contact with the supporting surface.

According to one embodiment, the present disclosure is related to a radiation image scanner that reads a radiation image from an imaging plate, the radiation image scanner including: a stage that holds the imaging plate; an excitation light source that irradiates the imaging plate held by the stage with excitation light; and a photodetector that detects light emitted from the imaging plate by the excitation light, in which the stage includes: a stage body that includes a supporting surface capable of being brought into surface contact with a back surface of the imaging plate; and a positioning mechanism that includes a positioning surface being in contact with an edge portion of the imaging plate supported on the supporting surface and positioning the edge portion from outside along the supporting surface while pressing the edge portion against the supporting surface.

According to the radiation image scanner, the edge portion of the imaging plate comes into contact with the positioning surface, so that the imaging plate is maintained in a normal posture.

Furthermore, the edge portion of the imaging plate is pressed against the supporting surface by the positioning surface.

Thus, the imaging plate can be held in the normal posture while being in contact with the supporting surface.

These and other objects, features, aspects and advantages of the present disclosure will become more apparent from the following detailed description of the present disclosure when taken in conjunction with the accompanying drawings.

BRIEF DESCRIPTION OF THE DRAWINGS

FIG. 1 is a schematic perspective view illustrating a scanner according to one embodiment;

FIGS. 2 and 3 are perspective views each illustrating an internal structure of the scanner;

FIG. 4 is a partial front view illustrating the internal structure of the scanner;

FIG. 6 is a front view illustrating a stage;

FIGS. 11 and 12 are rear views each illustrating the stage; and

DETAILED DESCRIPTION

One Embodiment

<Entire Configuration>

Figure 3:
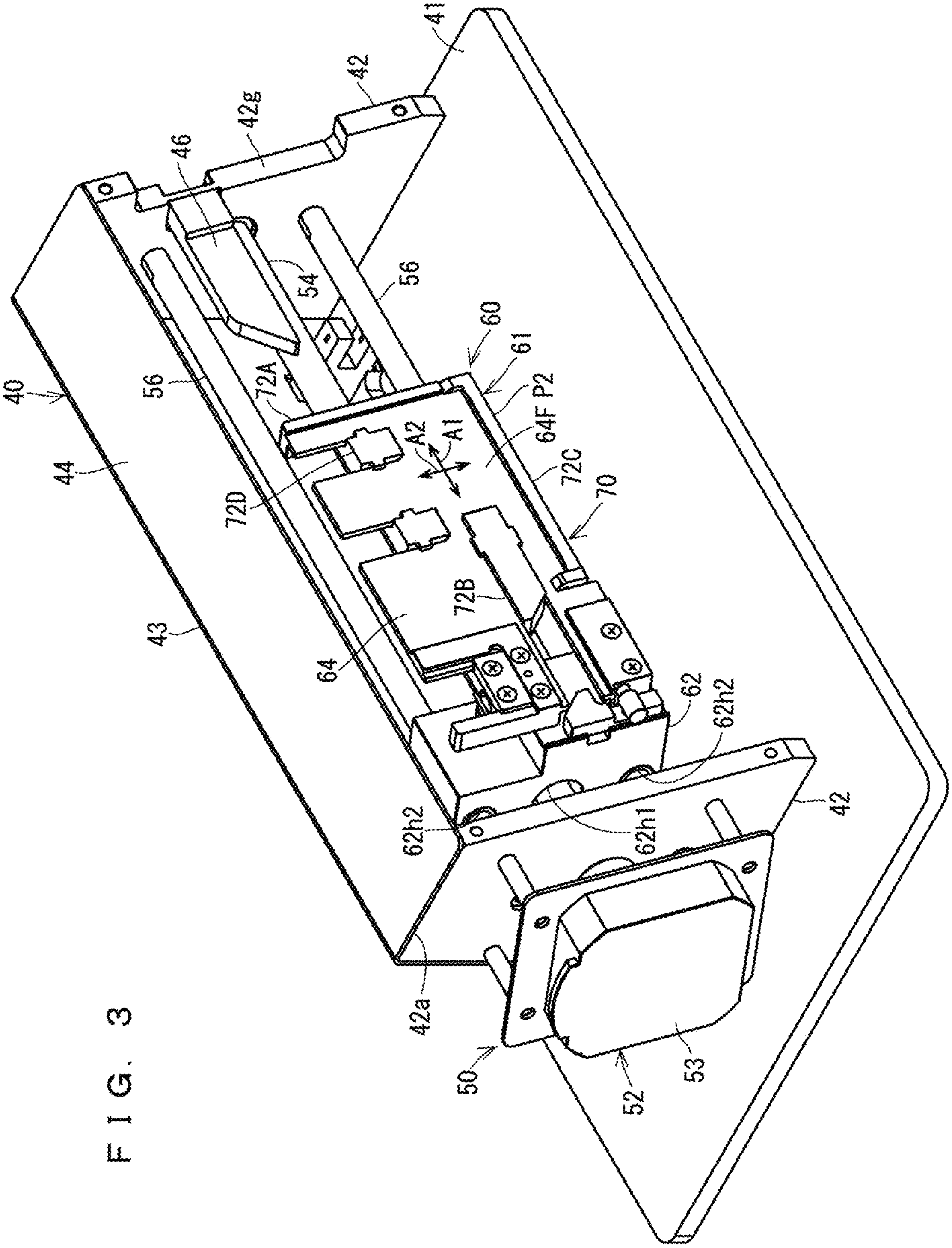

A radiation image scanner according to an embodiment will be described below. FIG. 1 is a schematic perspective view illustrating a scanner 20. FIGS. 2 and 3 are perspective views illustrating an internal structure of the scanner 20. FIG. 2 illustrates a state in which a stage 60 is located at a setting position, and FIG. 3 illustrates a state in which the stage 60 is located on an inside (reading position) of the setting position. The radiation image scanner 20 is a device that reads a radiation image from an imaging plate 10.

The imaging plate 10 has a flat shape including a radiation image forming layer 11, and is a storage medium that stores the radiation image. The radiation image forming layer 11 is a layer that accumulates energy of the emitted radiation and emits emission light corresponding to the accumulated energy. For example, the radiation image forming layer 11 is formed by applying a stimulable phosphor to one main surface of a film formed of a resin. When an X-ray from an X-ray generator is applied to the imaging plate 10 through a capturing object, the energy corresponding to intensity of the X-ray is accumulated in the radiation image forming layer 11. Because the intensity of the X-ray is based on a distribution of an X-ray absorption region in the capturing object, the distribution of the energy accumulated in the radiation image forming layer 11 is the radiation image of the capturing object by the X-ray. In this manner, the imaging plate 10 stores a radiation image by X-rays as a latent image.

The scanner 20 is a device that reads the radiation image from the radiation image forming layer 11 to generate image data of the radiation image. The scanner 20 includes the stage 60, an excitation light source 92, and a photodetector 94. The stage 60 holds the imaging plate 10. The imaging plate 10 held by the stage 60 is irradiated with excitation light from the excitation light source 92. When the imaging plate 10 is irradiated with the excitation light, the radiation image forming layer 11 of the imaging plate 10 emits light.

The photodetector 94 detects the emission light. The image data of the radiation image is generated based on a detection signal of the photodetector 94.

The surface of the imaging plate 10 on which the radiation image forming layer 11 is formed may be regarded as an excitation light irradiation surface. A back surface opposite to the surface may be regarded as a contact surface that faces a supporting surface 64F of the stage 60 and is in contact with the supporting surface 64F. When the imaging plate 10 is correctly set on the stage 60 with respect to the front and back surfaces, the surface of the imaging plate 10 facing the supporting surface 64F is a storage surface capable of storing the latent image and is a reading surface from which the stored latent image is read.

A configuration of each portion of the scanner 20 will be described.

<Case>

The scanner 20 includes a housing 30 (see FIG. 1), and the stage 60, the excitation light source 92, and the photodetector 94 are housed in the housing 30.

A setting portion 31 and an outlet port 32 are provided in the housing 30. For example, the setting portion 31 is provided on an upward surface of the housing 30. The setting portion 31 has a slit 31S through which the imaging plate 10 can pass. A user of the scanner 20 can put the imaging plate 10 into the scanner 20 through the slit 31S. The imaging plate 10 placed in the scanner 20 is set on the stage 60. The outlet port 32 is provided in a lower portion of the housing 30, for example, in a lower portion of one side surface of the housing 30. The outlet port 32 is open outward, and the imaging plate 10 ejected from the stage 60 is ejected to the outlet port 32. The user of the scanner 20 can collect the read imaging plate 10 through an outward opening of the outlet port 32.

A switch 33 that receives various instructions is provided in the housing 30. For example, the switch 33 is a power switch, a start switch that instructs start of reading.

A display device 34 may be provided in the housing 30. For example, the display device 34 is configured of a liquid crystal display panel or an organic electro-luminescence (EL) display panel. The read radiation image may be displayed on the display device 34. Various pieces of information for operation may be displayed on the display device 34. The display device 34 may display information about a reading progress status such as a remaining time from a start of reading to the end of reading. A warning, a caution, or error information for an erroneous operation or the like on the scanner 20 may be displayed on the display device 34. The display device 34 may be a touch panel having a display function and a touch detection function. In this case, at least a part of the function of the switch may be incorporated in the touch panel. The display device 34 may be omitted.

It is not essential that the image data of the radiation image generated by reading the imaging plate 10 is displayed on the display device 34. The image data of the radiation image may be transmitted to another computer (not illustrated) that can communicate with the scanner 20 by wireless communication or wired communication. The image data of the radiation image may be recorded on a data recording medium (for example, flash memory) detachably attached to the scanner 20.

Plate housing cases 38, 39 capable of housing the imaging plate 10 may be provided in the housing 30. In the example of FIG. 1, the plate housing cases 38, 39 are provided on an upper surface of the housing 30. The plate housing case 38 is a case with a partition, and the plate housing case 39 is a case with a lid. For example, the imaging plate 10 can be stored in the cases 38, 39 by selectively using the cases 38, 39 according to the use state of the imaging plate 10, such as before capturing, after capturing, before reading, and after reading. The plate housing cases 38, 39 may be omitted.

An AC adapter 37 is connected to the scanner 20, and power is supplied from the outside to the scanner 20. Power supply to the scanner 20 may be performed from the outside or performed from a power supply incorporated in the scanner 20. When the scanner 20 includes a rechargeable battery, the AC adapter may be used for charging the scanner 20.

<Internal Configuration of Case>

A configuration of each portion provided inside the housing 30 will be described.

A support member 40 is provided inside the housing 30. The stage 60, the excitation light source 92, and the photodetector 94 are supported by the support member 40.

<Support Member>

As illustrated in FIGS. 2 and 3, the support member 40 includes a base plate 41, a pair of side plates 42, a back plate 43, a ceiling plate 44, and a support frame 45.

The base plate 41 is a plate member disposed along a horizontal direction (a direction perpendicular to a direction of gravity) at a lower portion in the internal space of the housing 30. Here, the base plate 41 is formed in an elongated rectangular plate shape.

The pair of side plates 42 is supported in an erected state on the base plate 41. The pair of side plates 42 is provided in parallel with each other at an interval. The pair of side plates 42 is formed in a rectangular shape, for example, a trapezoidal plate shape in which an upper side or edge is shorter than a lower side or edge. Lower portions of the pair of side plates 42 are fixed to the base plate 41 by screwing or the like.

The ceiling plate 44 is formed in an elongated plate shape. The ceiling plate 44 is fixed to the pair of side plates 42 by screwing or the like so as to close the support member 40 between the side portions on the upper side of the pair of side plates 42. A method for fixing the various plates described above may be another method such as welding.

One side connecting the upper side and the lower side of the side plate 42 has an inclined side portion inclined obliquely at an angle of less than 90° with respect to the lower bottom. The support frame 45 has a short side portion 45*a* and a pair of long side portions 45*b*. The short side portion 45*a* is formed so as to have a length corresponding to the inclined side portion of the side plate 42. The pair of long side portions 45*b* is formed so as to have a length corresponding to the distance between the pair of side plates 42. The pair of long side portions 45*b* extends in the same direction from both ends of the short side portion 45*a* perpendicular to the short side portion 45*a*. Distal ends of the pair of long side portions 45*b* are fixed to the inclined side portion of one (right side in FIG. 2) side plate 42 by screwing or the like, and the short side portion 45*a* is fixed to the inclined side portion of the other (left side in FIG. 2) side plate 42 by screwing or the like. Thus, the support frame 45 is supported by the pair of side plates 42 inclined obliquely with respect to the direction of gravity. In this state, an outer surface of the support frame 45 faces obliquely upward at an angle exceeding 90° with respect to an upper surface of the base plate 41. The excitation light source 92 and the photodetector 94 are attached to the support frame 45. In the following description, for convenience, a side on which the excitation light source 92 and the photodetector 94 are provided is sometimes referred to as a front side, and the opposite side is sometimes referred to as a rear side.

The back plate 43 is formed in an elongated rectangular plate shape. Side portions on both ends in the longitudinal direction of the back plate 43 are fixed to the other side portion connecting the upper side and the lower side of the pair of side plates 42 by screwing or the like. Thus, the back plate 43 closes the rear side opening between the pair of side plates 42.

The ceiling plate 44 is formed in an elongated rectangular plate shape. Side portions on both ends in the longitudinal direction of the ceiling plate 44 are fixed to side portions on the upper side of the pair of side plates 42 by screwing or the like. Thus, the ceiling plate 44 closes the upper opening between the pair of side plates 42.

The excitation light source 92 and the photodetector 94 are fixed to an outer surface of a longitudinal intermediate portion of the pair of long side portions 45*b* of the support frame 45 by screwing or the like. The stage 60 is movably supported in the space between the excitation light source 92 and the photodetector 94 between the pair of long side portions 45*b* of the support frame 45. In the following description, a relative movement direction of the stage 60 with respect to the excitation light source 92 and the photodetector 94 may be referred to as a main scanning direction A1. When the imaging plate 10 held by the stage 60 passes through the space between the excitation light source 92 and the photodetector 94, the imaging plate 10 is radiated with the excitation light from the excitation light source 92, and the emission light of the imaging plate 10 due to the excitation light is detected by the photodetector 94.

<Excitation Light Source and Photodetector>

The excitation light source 92 irradiates the imaging plate 10 held by the stage 60 with the excitation light. The excitation light is light exciting the radiation image forming layer 11, and for example, is laser light of a specific wavelength exciting the radiation image forming layer 11. When the radiation image forming layer 11 is irradiated with the excitation light, the radiation image forming layer 11 emits light according to a distribution of the energy accumulated in the radiation image forming layer 11.

The excitation light source 92 may include a laser light source that emits the laser light as the excitation light and a micro electro mechanical systems (MEMS) mirror. For example, the laser light source may be reflected by the MEMS mirror such that an irradiation destination of the laser light from the laser light source moves along a sub-scanning direction A2 intersecting (orthogonal to) the main scanning direction A1 with respect to a surface 11S of the radiation image forming layer 11. A galvanometer mirror, a polygon mirror, or the like can be used as the configuration of the mirror instead of the MEMS mirror. Depending on the configuration of the mirror, the configuration of the lens system may be additionally required, but can be used in the present disclosure by an appropriate combination.

The photodetector 94 is a sensor that detects the light emitted from the imaging plate 10 by the excitation light and outputs a signal corresponding to the intensity. The image data of the radiation image is generated based on the signal from the photodetector 94.

The photodetector 94 may have a configuration in which elements detecting the light are arranged in a line. For example, the photodetector 94 may be arranged in a posture in which the array direction of the elements is parallel to the sub-scanning direction A2. The element that detects the light may be a silicon photomultiplier, a photomultiplier, a photodiode, or the like.

In one embodiment, the excitation light source 92 and the photodetector 94 are integrated as a reading unit 90. For example, the excitation light source 92 and the photodetector 94 are integrated while being accommodated in a module case 91. A reading slit 90S elongated along the sub-scanning direction A2 is formed in a portion of the module case 91 facing the side of the support member 40. The excitation light is emitted toward the imaging plate 10 through the reading slit 90S. The emission light of the imaging plate 10 passes through the reading slit 90S and is detected by the photodetector 94.

During the movement of the stage 60 along the main scanning direction A1, the laser light from the excitation light source 92 enters the surface of the radiation image forming layer 11 of the imaging plate 10 held by the stage 60, and the irradiation destination moves along the sub-scanning direction A2. Thus, the surface of the radiation image forming layer 11 sequentially generates the emission light along the line along the sub-scanning direction A2.

The photodetector 94 is provided at a position where the emission light of the radiation image forming layer 11 generated by the laser light from the excitation light source 92 can be detected. For example, the excitation light source 92 is disposed so as to irradiate the imaging plate 10 with the laser light from an oblique direction, and the photodetector 94 is disposed in front of a position irradiated with the laser light on the imaging plate 10. When the surface of the radiation image forming layer 11 sequentially generates the emission light along the line along the sub-scanning direction A2, the emission light is detected by the photodetector 94.

During the movement of the stage 60, scanning of the excitation light source 92 in the sub-scanning direction A2 and scanning by the photodetector 94 are repeatedly performed, so that a radiation image of a wide surface of the imaging plate 10, for example, the entire surface of the imaging plate 10, is read by the photodetector 94.

It is not essential that the stage 60 moves. For example, the excitation light source 92 and the photodetector 94 may move while the stage 60 is stopped. Alternatively, the stage 60 and both the excitation light source 92 and the photodetector 94 may move.

<Stage and Stage Movement Configuration>

Figure 5:
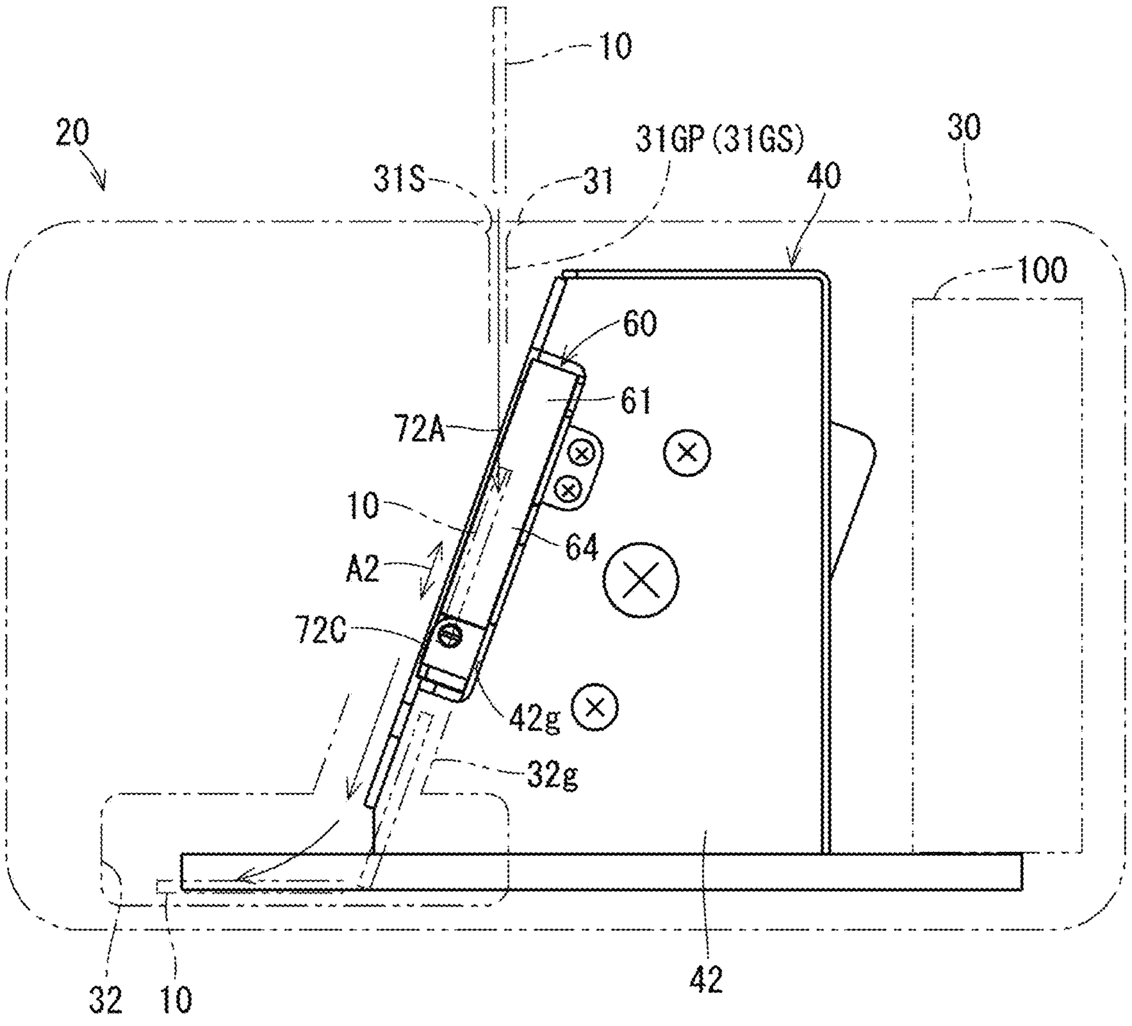
FIG. 5 is a side view illustrating the internal structure of the scanner.

FIG. 4 is a partial front view illustrating the internal structure of the scanner 20, and FIG. 5 is a side view illustrating the internal structure of the scanner 20. In FIGS. 4 and 5, the outer shape of the housing 30 is indicated by a two-dot chain line.

The stage 60 is configured to hold the imaging plate 10. For example, the stage 60 includes a plate portion that expands larger than the imaging plate 10. The imaging plate 10 is held at a constant position and in a constant posture with respect to the stage 60 while being in contact with the supporting surface 60F on one main surface side of the stage 60. A configuration in which the stage 60 holds the imaging plate 10 will be described later in more detail.

The stage 60 moves along the main scanning direction A1 while holding the imaging plate 10. A configuration movably supporting the stage 60 will be described.

A recess 42*g* corresponding to a vertical width and a thickness of the plate portion of the stage 60 is formed in the inclined side portion of the one side plate 42. The stage 60 can reciprocate between a position (see FIG. 2) protruding to the outside of the one side plate 42 and a position (see FIG. 3) between the pair of side plates 42 along the main scanning direction A1 by passing through the recess 42*g*.

The stage 60 is configured to be movable and driven by a stage moving mechanism 50. The stage moving mechanism 50 includes a movement driving portion 52 (see FIGS. 2 and 3) and a pair of guide rods 56.

The movement driving portion 52 applies driving force along the main scanning direction A1 to the stage 60. In one embodiment, the movement driving portion 52 includes a motor 53 (see FIGS. 2 and 3) and a screw shaft portion 54. The screw shaft portion 54 is a rod member in which a screw groove is formed around the screw shaft portion. The screw shaft portion 54 is rotatably supported by the pair of side plates 42 so as to bridge between the pair of side plates 42. The motor 53 is fixed to the support member 40 such that the motor 53 does not rotate relative to the support member 40. For example, the motor 53 is fixed to the outer surface of the other side plate 42. The shaft of the motor 53 is fixed to the screw shaft portion 54 so that the shaft of the motor 53 does not rotate relative to the screw shaft portion 54, and the screw shaft portion 54 is rotationally driven in the forward rotation direction or the reverse rotation direction according to the rotation in the forward rotation direction or the reverse rotation direction of the motor 53. The rotational movement of the shaft of the motor 53 may be transmitted to the screw shaft portion 54 through a transmission device such as a gear or a pulley. The rotation of the screw shaft portion 54 drives the stage 60 such that the stage 60 moves along the main scanning direction A1. The configuration for this will be described in more detail later.

The guide rod 56 is an elongated rod member, and is fixed to the pair of side plates 42 so as to bridge the pair of side plates 42. The guide rod 56 is inserted through a guide hole 62*h*2 formed in the stage 60. Accordingly, the guide rod 56 can play a role of preventing the rotation of the stage 60 around the screw shaft portion 54. In this case, a plurality of (two) guide rods 56 are provided. However, one guide rod may be provided.

The movement driving portion 52 only needs to be an actuator that moves the stage 60, and may be a linear motor or the like in addition to the above configuration.

The stage 60 is reciprocated between a setting position P1 and a reading position P2 by the stage moving mechanism 50.

The setting position P1 is a position where the imaging plate 10 can be set with respect to the stage 60 (see a position in FIG. 2). In one embodiment, the setting position P1 is set at the position protruding to the outside or outer side of the one side plate 42. At the setting position P1, a portion of the stage 60 closer to the one side plate 42 is disposed in the recess 42*g* of one side plate 42, and the intermediate portion and the remaining portion of the stage 60 in the longitudinal direction extend outward from the one side plate 42 (see FIGS. 2 and 4). At the setting position P1, an arrangement region of the imaging plate 10 set in the setting portion 31 is disposed outside the side plate 42. A maximum arrangement region when the imaging plates 10 of a plurality of sizes are assumed can be a region between a straight line R1 and a straight line R2 in FIG. 2.

In this state, the supporting surface 64F of the stage 60 is inclined with respect to the direction of gravity. In this case, the supporting surface 64F is inclined along the same inclination direction as the inclined side portion of the side plate 42. That is, the supporting surface 64F is inclined so as to face obliquely upward.

The stage 60 located at the setting position P1 can receive the imaging plate 10 inserted from the setting portion 31. More specifically, the setting position P1 is provided below the slit 31S in the setting portion 31 (see FIG. 4). When the imaging plate 10 is inserted into the slit 31S from the outside of the scanner 20, the imaging plate 10 moves downward, namely, in the direction of gravity by its own weight. When the lower edge portion of the imaging plate 10 reaches the supporting surface 64F, the lower edge portion of the imaging plate 10 slides obliquely downward according to the inclination of the supporting surface 64F. Thus, the imaging plate 10 is inclined according to the inclination of the supporting surface 64F, and the back surface of the imaging plate 10 can be brought into surface contact with the supporting surface 64F. In this state, the imaging plate 10 is positioned and held by a positioning mechanism (described later) provided on the stage 60. In one embodiment, as described above, the gravity is used when the imaging plate 10 is guided to the normal posture.

In the housing 30, an imaging plate (IP) guiding surface 31GS that guides the imaging plate 10 toward the supporting surface 64F may be formed. In one embodiment, the plate guide portion 31G extending from a periphery of the slit 31S toward the inside of the housing 30 is formed. In the plate guide portion 31G, a guide passage 31GP continuous with the slit 31S is formed. The guide passage 31GP extends downward from the slit 31S, in this case, directly downward. The guide passage 31GP may be directed obliquely downward from the slit 31S. The lower end portion of the guide passage 31GP is positioned above the supporting surface 64F of the stage 60 positioned at the setting position P1. The lower end portion of the guide passage 31GP and the supporting surface 64F are separated from each other in some embodiments. An inner peripheral surface of the plate guide portion 31G forming the guide passage 31GP is the IP guiding surface (imaging plate guiding surface) 31GS that guides the imaging plate 10 toward the supporting surface 64F.

Then, when being inserted into the slit 31S, the imaging plate 10 slides down the guide passage 31GP while the positions along the thickness and the width of the imaging plate 10 are regulated by the IP guiding surface 31GS. For this reason, the imaging plate 10 is guided toward the supporting surface 64F without being detached from the supporting surface 64F.

The setting position P1 is not necessarily set to the above position, but for example, may be set between the pair of side plates 42.

The reading position P2 is a position where the excitation light source 92 and the photodetector 94 read the radiation image, namely, a position where the photodetector 94 reads the radiation image of the imaging plate 10 according to the excitation light from the excitation light source 92. In one embodiment, the reading position P2 is set at the position between the pair of side plates 42, 42. That is, the reading unit 90 including the excitation light source 92 and the photodetector 94 is fixed to the outer portions of the pair of long side portions 45*b* of support frame 45 by screwing or the like. The reading unit 90 is located between the pair of side plates 42 and is closer to the setting position P1. The reading slit 90S is formed on the surface of the reading unit 90 facing the inside of the housing 30. The excitation light from the excitation light source 92 in the reading unit 90 is emitted to the imaging plate 10 on the stage 60 through the reading slit 90S. In addition, the emission light from the imaging plate 10 excited by the excitation light is incident on the photodetector 94 through the reading slit 90S. In FIG. 2, the position farther from the setting position P1 with respect to a straight line R3 passing through the reading slit 90S is the reading position P2.

When being set on the stage 60 at the setting position P1, the imaging plate 10 moves toward the inside of the support member 40 along the main scanning direction A1. When the imaging plate 10 set on the stage 60 reaches the position facing the reading slit 90S, the reading unit 90 starts the reading of the radiation image of the imaging plate 10. As the stage 60 moves, the radiation image of the imaging plate 10 is sequentially read by the reading unit 90. When the imaging plate 10 passes through the reading slit 90S, the reading by the reading unit 90 ends. When the radiation image is read during the movement of the stage 60 as in the embodiment, the reading position P2 may be regarded as the position where the imaging plate 10 (the widest imaging plate 10 in the case where the imaging plates 10 of a plurality of sizes are assumed) on the stage 60 reaches the straight line R3 to start the reading.

Unlike the above example, the case where the reading unit 90 moves along the main scanning direction A1 with respect to the imaging plate 10 being stationary at the fixed position to read the radiation image or the case where a three-dimensional sensor reads the radiation image with respect to the imaging plate 10 being stationary at the fixed position is also possible. In this case, the position where the imaging plate 10 is held at the fixed position is the reading position P2.

In one embodiment, the stage 60 is also moved to an eject position P3 by the stage moving mechanism 50. The eject position P3 is a position where the imaging plate 10 set on the stage 60 is ejected. The eject position P3 is set at a position farther from the reading position P2 than the setting position P1 (see the stage 60 indicated by a two-dot chain line in FIGS. 2 and 4). The present disclosure is not limited to this example, but the imaging plate 10 of the stage 60 may be ejected by a separate mechanism at a position different from the eject position P3, for example, at the setting position P1.

The outlet port 32 is provided below the eject position P3. For example, an eject guide 32*g* that guides the imaging plate 10 downward is provided below the stage 60 at the eject position P3. The outlet port 32 forming a eject space that is open to the side of the housing 30 is formed below the eject guide 32*g*. The imaging plate 10 ejected from the stage 60 at the eject position P3 slides down to the outlet port 32 through the eject guide 32*g* and is ejected onto the bottom surface of the outlet port 32.

In one embodiment, the stage 60 is also moved to a back side position P4 by the stage moving mechanism 50. The back side position P4 is located on the opposite side of the reading position P2 from the setting position P1. That is, the stage 60 can move from the setting position P1 to the back side position P4 through the reading position P2. At the back side position P4, the imaging plate 10 on the stage 60 may be exposed without being covered by the reading unit 90.

The operation of the stage moving mechanism 50 is controlled by a controller 100 (see FIG. 5). For example, the controller 100 includes a computer including at least one processor and a storage. The processor is a central processing unit (CPU) or the like, and includes an electric circuit. The processor executes a reading program to implement various functions for the reading. The controller 100 controls the rotation direction and the rotation amount of the motor 53 to control the movement of the stage 60 along the main scanning direction A1.

The controller 100 may control the excitation light source 92 and the photodetector 94 by the reading unit 90. Various types of signal processing for generating the radiation image based on the signal detected by the photodetector 94, image processing, display processing by the display device 34, and the like may be performed by the controller 100.

<Overall Configuration of Stage>

The overall configuration of the stage 60 will be described. As illustrated in FIGS. 2 to 5, the stage 60 includes a stage body 61 and a positioning mechanism 70.

The stage body 61 includes a supporting surface 64F that can be brought into surface contact with the back surface of the imaging plate 10. In one embodiment, the stage body 61 includes a movable support 62 and a plate portion 64.

The movable support 62 is formed in a rectangular parallelepiped shape. A through-hole 62*h*1 is made in the movable support 62 (see FIG. 3). The through-hole 62*h*1 is a through-hole including a screw groove. The screw shaft portion 54 rotatable in both forward and reverse directions by the motor 53 is screwed into the through-hole 62*h*1. The stage 60 moves to one side along the screw shaft portion 54 when the screw shaft portion 54 rotates in the forward rotation direction, and the stage 60 can move to the other side along the screw shaft portion 54 when the screw shaft portion 54 rotates in the reverse rotation direction. For example, such the structure is a structure called a ball screw.

A guide hole 62*h*2 parallel to the through-hole 62*h*1 is made in the movable support 62 (see FIG. 3). Thus, the movable support 62 is moved and driven in both directions along the main scanning direction A1 according to the rotation in the forward rotation direction or the reverse rotation direction of the screw shaft portion 54 screwed into the through-hole 62*h*1 under the guide of the guide rod 56 inserted into the guide hole 62*h*2.

The plate portion 64 is formed in a shape that is larger than the imaging plate 10 and spreads in a plate shape, in this case, a rectangular plate shape. The plate portion 64 is not necessarily formed in the rectangular plate shape, but may be formed in another shape such as an elliptical shape.

The supporting surface 64F is provided on the surface on one side of the plate portion 64. The supporting surface 64F may be wider than the imaging plate 10. When multiple sizes are contemplated for the imaging plate 10, the supporting surface 64F may be wider than the largest imaging plate 10.

More specifically, the plate portion 64 is formed in a rectangular shape elongated along one direction (in this case, the main scanning direction A1). Of the surface on the other side of the plate portion 64 (the surface on the side opposite to the supporting surface 64F), a portion on one side in the longitudinal direction of the plate portion 64 is fixed to the movable support 62. For example, the fixing is performed by screwing. The plate portion 64 is supported in a cantilever manner by the movable support 62 so as to extend from the movable support 62 toward the side of the setting position P1 along the main scanning direction A1. The portion of the surface on one side of the plate portion 64 on the side supported by the movable support 62 protrudes through a step portion more than other portions (portions including the supporting surface 64F). The supporting surface 64F that can be brought into surface contact with the back surface of the imaging plate 10 is provided at a portion extending from the movable support 62 along the main scanning direction A1 in the surface on one side of the plate portion 64.

In the support state, the plate portion 64 and the supporting surface 64F are inclined with respect to the gravity direction (downward direction), and the supporting surface 64F is directed obliquely upward. In one embodiment, the inclination angle of the plate portion 64 and the supporting surface 64F is matched with the inclination angle of the inclined side portion of the side plate 42. The plate portion 64 and the supporting surface 64F move along the main scanning direction A1 under the guide of the guide rod 56 while maintaining a constant inclination angle. When the movable support 62 moves toward the one side plate 42, the portion of the plate portion 64 extending from the movable support 62 passes through the recess 42*g* of the side plate 42. In this state, the supporting surface 64F is inclined so as to face obliquely upward, so that the imaging plate 10 inserted through the slit 31S can be received on the supporting surface 64F.

The positioning mechanism 70 includes positioning surfaces 72AF, 72BF, 72CF, 72DF that come into contact with the edge portion of the imaging plate 10 supported on the supporting surface 64F, position the edge portion from the outside in the extending direction of the supporting surface 64F, i.e. in direction(s) from the outside towards the inside of the supporting surface 64F, and press the edge portion against the supporting surface 64F (see FIG. 4).

The edge portion of the imaging plate 10 does not mean only the surface (for example, the side surface) facing the outside in planar view of the imaging plate 10, but may include the portion opposite from the surface facing the outside. For example, the edge portion of the imaging plate 10 may include the surface (for example, the side surface) facing outward in planar view of the imaging plate 10 and an outer peripheral portion of the surface of the imaging plate 10.

The positioning mechanism 70 may include at least one of the positioning surfaces 72AF, 72BF, 72CF, 72DF. In order that the positioning mechanism 70 positions the imaging plate 10 in at least two directions, the positioning mechanism 70 may have at least two positioning surfaces 72AF, 72BF, 72CF, 72DF facing different directions (for example, directions orthogonal to each other). In one embodiment, the positioning mechanism 70 include a horizontal positioning mechanism and a vertical positioning mechanism. For this reason, the imaging plate 10 is positioned at the fixed position in the horizontal direction and the vertical direction.

The imaging plate 10 moves to the reading position P2 while being held in the normal posture by the positioning mechanism 70. At the reading position P2, the radiation image of the imaging plate 10 held in the normal posture on the stage 60 is read by the reading unit 90. The normal posture is a posture of the imaging plate 10 set previously with reference to the stage 60, and is a predetermined posture suitable for the reading by the reading unit 90. In one embodiment, the positioning surfaces 72AF, 72CF are disposed at fixed positions on the supporting surface 60F of the stage 60. The normal posture is a state in which the edge portion on one side of the imaging plate 10 is in contact with the positioning surface 72AF while the edge portion on the lower side of the imaging plate 10 is in contact with the positioning surface 72CF.

Hereinafter, the positioning mechanism will be described in more detail.

<Positioning Mechanism>

Figure 7:
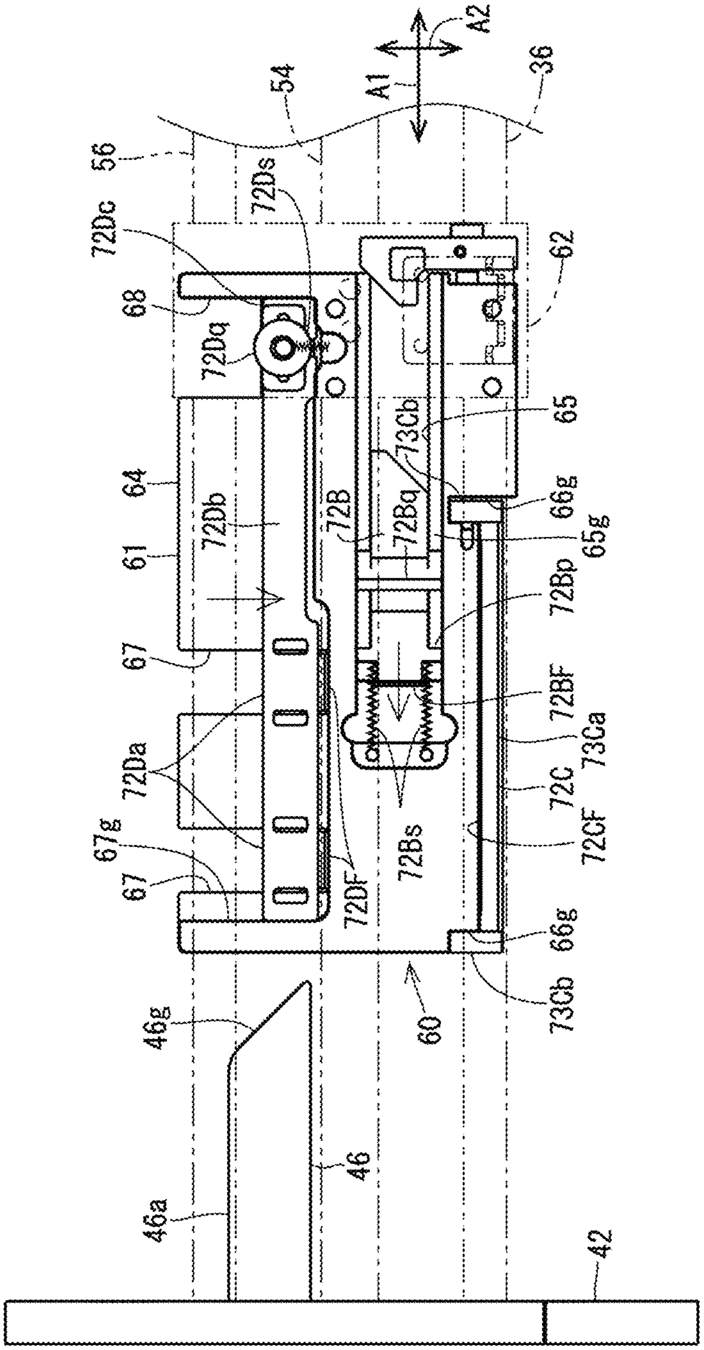
FIG. 7 is a rear view illustrating a portion of a stage in a positioning mechanism.
Figure 8:
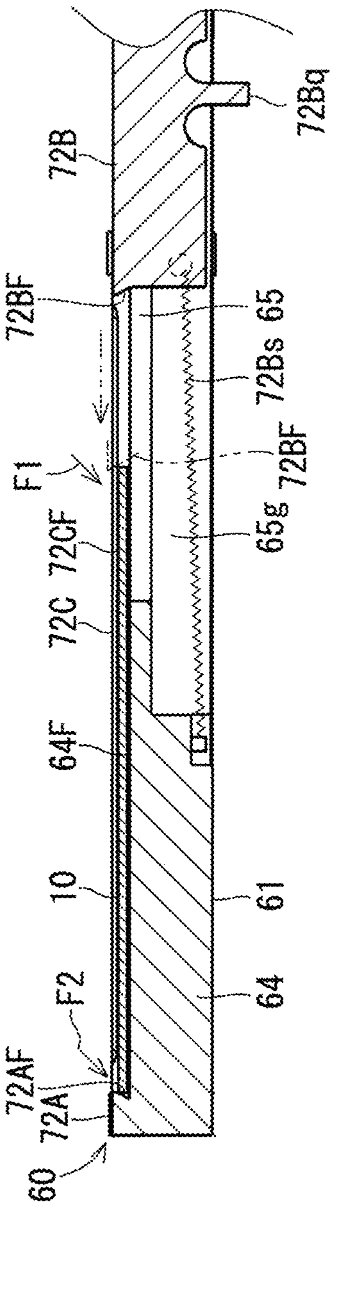
FIG. 8 is a partially sectional view taken along a line VIII-VIII in FIG. 6.
Figure 9:
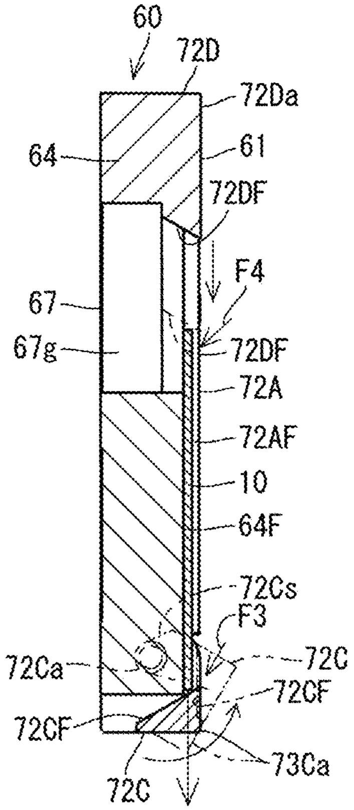
FIG. 9 is a sectional view taken along a line IX-IX in FIG. 6.

FIG. 6 is a front view illustrating the stage 60. FIG. 7 is a rear view illustrating the stage 60 in the positioning mechanism. Similarly to FIGS. 2 and 4, FIG. 6 illustrates the state in which the imaging plate 10 is located at the setting position P1. FIG. 7 illustrates the state in which the imaging plate 10 is located at the reading position P2. In FIG. 6, the imaging plates 10 of a plurality of sizes are indicated by two-dot chain lines. In FIG. 7, one side plate 42 and an actuation piece 46 are illustrated as an example of a fixed disposition portion operating the positioning mechanism. FIG. 8 is a partial sectional view taken along a line VIII-VIII in FIG. 6, and FIG. 9 is a sectional view taken along a line IX-IX in FIG. 6.

As illustrated in FIGS. 2 to 9, the positioning mechanism 70 includes four positioning holders 72A, 72B, 72C, 72D. The imaging plate 10 is horizontally positioned by the positioning holders 72A, 72B, and the imaging plate 10 is vertically positioned by the positioning holders 72C, 72D. When the imaging plate 10 is located at the setting position P1, the right and left positioning holders 72A, 72B are open, and the upper and lower positioning holders 72C, 72D are also open (see FIGS. 2, 4, 6, 8, and 9). In this state, the imaging plate 10 can be set on the stage 60. In the state where the imaging plate 10 is located at the reading position P2, the right and left positioning holders 72A, 72B approach each other, and the upper and lower positioning holders 72C, 72D also approach each other (see FIGS. 3 and 7). In this state, the imaging plate 10 is held on the stage 60.

<Positioning Mechanism in Horizontal Direction>

The positioning holder 72A is an elongated portion protruding along one side portion of the plate portion 64 in the horizontal direction. The positioning holder 72A extends in the vertical direction along a boundary on one side in the horizontal direction among boundaries surrounding the supporting surface 64F. The positioning holder 72A protrudes from the supporting surface 64F. The length of the positioning holder 72A may be longer than a vertical dimension (the maximum vertical dimension when the plurality of sizes are assumed) of the imaging plate 10 supported on the supporting surface 64F.

The surface of the positioning holder 72A facing inward is formed on the positioning surface 72AF. More specifically, the positioning surface 72AF is provided so as to protrude from the supporting surface 64F by at least a thickness dimension of the imaging plate 10, and is formed as a guide positioning surface toward a direction covering the supporting surface 64F and separate from the supporting surface 64F (see FIG. 8). The positioning surface 72AF may be understood to be a surface that guides the edge portion of the imaging plate 10 toward the supporting surface 64F along a direction oblique to both the thickness direction of the imaging plate 10 and the direction toward the edge portion.

In one embodiment, the positioning holder 72A is integrally formed with the plate portion 64. For example, the plate portion 64 and the positioning holder 72A are integrally formed by cutting a metal base material. The plate portion 64 and the positioning holder 72A may be separately manufactured, and the positioning holder 72A may be fixed to the plate portion 64 by screwing or the like. In one embodiment, the positioning surface 72AF is continuous with the supporting surface 64F at an acute angle, but this is not essential.

The positioning holder 72B is provided to be opposite to the positioning holder 72A at an interval. Here, the positioning holder 72B is provided at an interval along the horizontal direction with respect to the positioning holder 72A.

More specifically, a slit 65 along the horizontal direction is formed in a portion of the plate portion 64 on the side fixed to the movable support 62. A recess 65*g* recessed from the side surface is formed in a peripheral portion of the slit 65 in the side surface of the plate portion 64 (see FIGS. 7 and 8). The positioning holder 72B is a separate body from the plate portion 64, and is disposed to be movable along the slit 65. More specifically, a part of the positioning holder 72B is formed in a shape that can be disposed in the slit 65. More specifically, the positioning holder 72B is formed in the plate shape elongated along the extending direction of the slit 65. The thickness of the positioning holder 72B is larger than the thickness of the portion of the plate portion 64 where the recess 65*g* is formed. The intermediate portion in the thickness direction of the positioning holder 72B is disposed in the slit 65. The positioning holder 72B includes protrusions 72Bp that can be brought into contact with both side edge portions of the slit 65 at both surfaces of the plate portion 64. The positioning holder 72B is supported so as to be able to reciprocate along the direction (main scanning direction A1) along the slit 65 while the protrusion 72Bp is in contact with both the side edge portions of the slit 65 from both surfaces of the plate portion 64.

The positioning surface 72BF is formed in the portion of the positioning holder 72B facing the side of the positioning holder 72A, namely, the portion facing the positioning surface 72AF. Similarly to the positioning surface 72AF, the positioning surface 72BF is formed in a plane in which the angle with respect to the supporting surface 64F is less than 90°. Here, the positioning surface 72BF extends so as to protrude from the portion on the back side of the supporting surface 64F in the slit 65 (see FIG. 8). The positioning holder 72B is movable between a separated position (see FIGS. 2, 4, and 5) away from the positioning holder 72A and an approach position (see FIGS. 3, 6, and 7) closer to the positioning holder 72A than the separated position. In the state where the stage 60 is located at the setting position P1, the positioning holder 72B is located at the separated position. In the state where the stage 60 is located at the reading position P2, the positioning holder 72B is movable to the approach position.

In the state where the positioning holder 72B is located at the separated position, the interval dimension between the positioning surface 72AF and the positioning surface 72BF is set to be larger than the width of the imaging plate 10. When the imaging plates 10 of the plurality of sizes are selectively set on the stage 60, the interval dimension is set to be larger than the largest width among the imaging plates 10 of the plurality of sizes.

In the state where the positioning holder 72B is located at the approach position, the interval dimension between the positioning surface 72AF and the positioning surface 72BF is set to be smaller than the width of the imaging plate 10. When the imaging plates 10 of the plurality of sizes are selectively set on the stage 60, the interval dimension is set to be smaller than the smallest width among the imaging plates 10 of the plurality of sizes.

Thus, the imaging plate 10 can be disposed between the positioning surfaces 72AF, 72BF while the positioning holder 72B is located at the separated position. In addition, the imaging plate 10 can be tucked between the positioning surfaces 72AF, 72BF by moving the positioning holder 72B from the separated position to the approach position.

More specifically, the positioning holder 72B is located at the separated position, and the imaging plate 10 is disposed on the supporting surface 64F while the positioning surface 72AF and the positioning surface 72BF are separated from each other (see FIGS. 6 and 8). In this state, the positioning surface 72BF moves toward the approach position (positioning surface 72AF). Then, one edge portion of the imaging plate 10 is pushed inward by the positioning surface 72BF, slides on the supporting surface 64F, and moves to the side of the positioning surface 72AF. Then, the edge portion of the imaging plate 10 on the side of the positioning surface 72AF is pressed against the positioning surface 72AF, and the movement to the side of the positioning surface 72AF is restricted.

As described above, the positioning surface 72BF forms the angle less than 90° with respect to the supporting surface 64F. For this reason, the edge portion of the imaging plate 10 on the side of the positioning surface 72BF is pushed toward the inside of the edge portion and the side of the supporting surface 64F (see an arrow F1).

The positioning surface 72AF is inclined to the side opposite to the positioning surface 72BF, and forms the angle less than 90° with respect to the supporting surface 64F. For this reason, the edge portion of the imaging plate 10 on the side of the positioning surface 72AF is pushed toward the side of the supporting surface 64F while being pushed toward the outside of the edge portion by the positioning surface 72BF (see an arrow F2).

That is, the edge portions on both sides in the horizontal direction of the imaging plate 10 are tucked between the positioning surfaces 72AF, 72BF, whereby the imaging plate 10 is positioned in the horizontal direction. In addition, both edge portions are pressed against the side on the supporting surface 64F by the positioning surfaces 72AF, 72BF. Thus, edge portions of the imaging plate 10 on both sides in the horizontal direction are guided so as to be in contact with the supporting surface 64F without floating from the supporting surface 64F. When a characteristic inclination in which a V-shape is drawn (that is, the surfaces 72AF, 72BF are inclined in the approach direction as the distance from the supporting surface 64F increases, see FIG. 8) by the positioning surfaces 72AF, 72BF is formed in this manner, action pressing the imaging plate 10 against the supporting surface 64F while sandwiching the imaging plate 10 is likely to work, and the imaging plate 10 can be easily supported to be maintained in the normal posture.

In one embodiment, the positioning holder 72A and the positioning holder 72B are an example of the pair of opening and closing positioning holders. The example in which both of the two opposing surfaces of the pair of opening and closing positioning holders (the positioning holder 72A and the positioning holder 72B) form the positioning surfaces 72AF, 72BF and one (positioning holder 72B) of the pair of opening and closing positioning holders (the positioning holder 72A and the positioning holder 72B) moves to adjust the distance between the pair of opening and closing positioning holders (the positioning holder 72A and the positioning holder 72B) has been described in the above embodiment.

However, one of the opposing surfaces of the positioning holder 72A and the positioning holder 72B may be a positioning surface in the sense of positioning the edge portion of the imaging plate 10 from the outside and pressing the edge portion against the supporting surface 64F. In addition, the distance between the pair of opening and closing positioning holders (the positioning holder 72A and the positioning holder 72B) may be adjusted by both moving.

Instead of moving at least one of the positioning holder 72A and the positioning holder 72B, the stage 60 supporting the imaging plate 10 may move with respect to the positioning holder 72A and the positioning holder 72B. For example, the opposing positioning surfaces 72AF, 72BF may be disposed in the V-shape at an interval, and the stage 60 holding the imaging plate 10 may move in the direction in which the interval is narrowed from the wider side between the positioning surfaces 72AF, 72BF to press both edge portions of the imaging plate 10 against the opposing positioning surfaces 72AF, 72BF. This also allows the imaging plate 10 to be supported between the positioning surfaces 72AF, 72BF to be pressed against the supporting surface 64F.

Both the positioning holder 72A and the positioning holder 72B do not need to have the positioning surface in the sense of positioning the edge portion of the imaging plate 10 from the outside and pressing the edge portion against the supporting surface 64F. For example, one of the positioning holder 72A and the positioning holder 72B may have the surface that extends perpendicularly from the supporting surface 64F to position the edge portion of the imaging plate 10 from the outside of the imaging plate 10 but does not have a function of pressing the edge portion toward the supporting surface 64F. Even in this case, the other of the positioning holder 72A and the positioning holder 72B can position the edge portion of the imaging plate 10 from the outside of the imaging plate 10 to press the edge portion toward the supporting surface 64F.

When at least one of the pair of upper and lower positioning holders 72C, 72D has the function of pressing the edge portion of the imaging plate 10 against the supporting surface 64F, there is no need for the pair of right and left positioning holders 72A, 72B to press the edge portion of the imaging plate 10 against the supporting surface 64F. In this case, the pair of positioning holders 72A, 72B positions the edge portion of the imaging plate 10 from the outside of the imaging plate 10, but may have a surface having no function of pressing the edge portion toward the supporting surface 64F, for example, the surface perpendicular to the supporting surface 64F. Furthermore, in this case, one of the positioning holder 72A and the positioning holder 72B may be omitted, and the other may restrict the position of the edge portion of the imaging plate 10 from only one direction in the horizontal direction.

<Positioning Mechanism in Vertical Direction>

The positioning holder 72C is an elongated portion protruding from one side portion of the plate portion 64 in the vertical direction, in this case, a lower side portion. The positioning holder 72C extends in the horizontal direction along the lower boundary of the boundary surrounding the supporting surface 64F. The positioning holder 72C protrudes from the supporting surface 64F. The length of the positioning holder 72C may be longer than the left-right dimension (the maximum left-right dimension when the plurality of sizes are assumed) of the imaging plate 10 supported on the supporting surface 64F.

The surface of the positioning holder 72C facing the inside (upper side) is formed on the positioning surface 72CF. In one embodiment, the positioning surface 72CF is formed in the guide surface (in this case, the plane) in which the angle with respect to the supporting surface 64F is less than 90°. Because the positioning surface 72CF is located below the supporting surface 64F inclined with respect to the direction of gravity, the positioning surface 72CF is an example of the surface that receives the lower edge portion of the imaging plate 10 moving downward along the supporting surface 64F.

In one embodiment, the positioning holder 72C is formed separately from the plate portion 64. The posture of the positioning holder 72C is configured to be changeable between a contact position and a retreat position (see FIG. 9). The contact position is a position where the positioning surface 72CF is opposite to the edge portion of the imaging plate 10 on the supporting surface 64F, and the retreat position is a position where the positioning surface 72CF is retreated from the edge portion of the imaging plate 10 on the supporting surface 64F.

More specifically, the lower portion of the portion of the plate portion 64 extending from the movable support 62 is recessed more than other portions. A pair of recesses 66*g* recessed further inward is formed at both ends of the recessed portion. The positioning holder 72C includes an elongated positioning body portion 73Ca and a pair of rotation support portions 73Cb. The positioning body portion 73Ca is set to have a length that can extend between the pair of recesses 66*g*. One of the surfaces surrounding the periphery of the positioning body portion 73Ca is formed on the positioning surface 72CF. The pair of rotation support portions 73Cb extends from both ends of the positioning body portion 73Ca. The pair of rotation support portions 73Cb is disposed in the pair of recesses 66*g*. A support shaft portion (not illustrated) provided in one of the pair of rotation support portions 73Cb and the pair of recesses 66*g* is fitted into a recess or a hole portion (both not illustrated) provided in the other, so that the positioning holder 72C is rotatably supported around the support shaft portion.

In the state where the positioning holder 72C is located at the contact position, as described above, the positioning surface 72CF is located so as to intersect with the downward extension of the supporting surface 64F, and the angle with respect to the supporting surface 64F is maintained at the angle less than 90°. For this reason, the lower edge portion of the imaging plate 10 sliding down on the supporting surface 64F can come into contact with the positioning surface 72CF (see the positioning holder 72C indicated by a solid line in FIG. 9).

When the position of the positioning surface 72CF is changed to the retreat position, the positioning surface 72CF retreats from the supporting surface 64F (see the positioning holder 72C indicated by a two-dot chain line in FIG. 9). That is, the positioning surface 72CF at the retreat position is not positioned at the position receiving the lower edge portion of the imaging plate 10 moved downward along the supporting surface 64F. In one embodiment, the positioning surface 72CF retreats in the direction away from the front side of the supporting surface 64F. The positioning surface 72CF can cover the edge portion of the imaging plate 10 on the supporting surface 64F. Thus, the positioning surface 72CF can be smoothly retreated in the direction away from the front side of the supporting surface 64F. The positioning surface 72CF may retreat to the back side of the supporting surface 64F. When the positioning surface 72CF moves to the retreat position, a gap from which the imaging plate 10 can escape is formed on the lower extension of the supporting surface 64F. The gap is a slit-shaped gap formed between the supporting surface 64F and the positioning surface 72CF when viewed from below the plate portion 64. The length of the gap is longer than the left-right dimension of the imaging plate 10 (the maximum left-right dimension when the plurality of sizes are assumed).

Therefore, when the positioning surface 72CF moves to the retreat position, the imaging plate 10 supported downward by the positioning surface 72CF can be ejected downward through the gap.

The positioning holder 72D is provided to be opposite to the positioning holder 72C at an interval. Here, the positioning holder 72D is provided at an interval obliquely upward along the supporting surface 64F with respect to the positioning holder 72C.

More specifically, a slit 67 extending downward from the inner edge portion is formed in the upper portion of the plate portion 64. Here, a plurality of (two) slits 67 are formed at intervals in the horizontal direction. A recess 67*g* recessed from the surface on the other side is formed in the upper portion of the surface on the other side of the plate portion 64 (see FIGS. 7 and 9). The positioning holder 72D is a separate body from the plate portion 64, and is disposed to be movable along the slit 67. The positioning holder 72D includes a positioning body portion 72Da and a coupling extension portion 72Db.

The coupling extension portion 72Db extends in the horizontal direction at the portion where the recess 67*g* is formed. The coupling extension portion 72Db extends in a direction connecting the plurality of slits 67, and further extends toward the side of the movable support 62.

The positioning body portion 72Da is provided corresponding to the slit 67. Here, a plurality of (two) positioning body portions 72Da are provided corresponding to the number and at the intervals corresponding to the plurality of (two) slits 67. The positioning body portion 72Da is integrally formed on the side of the slit 67 with respect to the coupling extension portion 72Db. The positioning body portion 72Da protrudes toward the side of the supporting surface 64F through the slit 67. The width of the positioning body portion 72Da is set to a size capable of moving the slit 67. The positioning holder 72D includes a protrusion 72Dp that can come into contact with both side edge portions of the slit 67 from the supporting surface 64F. The coupling extension portion 72Db is in contact with the bottom of the recess 67*g*, and the positioning body portion 72Da is supported to be able to reciprocate along the direction along the slit 67 (sub-scanning direction A2) while the protrusion 72Dp is in contact with both side edge portions of the slit 65 from the side of the supporting surface 64F.

The positioning surface 72DF is formed in the portion of the positioning body portion 72Da facing the side of the positioning holder 72C, namely, the portion opposite to the positioning surface 72CF. Similarly to the positioning surface 72AF, the positioning surface 72DF is formed in the plane in which the angle with respect to the supporting surface 64F is less than 90°. The positioning surface 72DF extends so as to protrude from the supporting surface 64F from the portion on the back side of the supporting surface 64F in the slit 67 (see FIG. 8).

The positioning holder 72D is movable between the separated position (see FIGS. 2, 4, 6, and 9) away from the positioning holder 72C and the approach position (see FIGS. 3 and 7) closer to the positioning holder 72C than the separated position. In the state where the stage 60 is located at the setting position P1, the positioning holder 72D is located at the separated position. In the state where the stage 60 is located at the reading position P2, the positioning holder 72D is movable to the approach position.

In the state where the positioning holder 72D is located at the separated position, the interval dimension between the positioning surface 72CF and the positioning surface 72DF is set to be larger than the height of the imaging plate 10. When the imaging plates 10 of the plurality of sizes are selectively set on the stage 60, the interval dimension is set to be larger than the largest height among the imaging plates 10 of the plurality of sizes.

In the state where the positioning holder 72D is located at the approach position, the interval dimension between the positioning surface 72CF and the positioning surface 72DF is set to be smaller than the height of the imaging plate 10. When the imaging plates 10 of the plurality of sizes are selectively set on the stage 60, the interval dimension is set to be smaller than the smallest height among the imaging plates 10 of the plurality of sizes.

Thus, the imaging plate 10 can be disposed between the positioning surfaces 72CF, 72DF while the positioning holder 72D is located at the separated position. When the positioning holder 72D moves from the separated position to the approach position, the imaging plate 10 can be tucked between the positioning surfaces 72CF, 72DF.

More specifically, the imaging plate 10 is disposed on the stage 60 while the positioning holder 72D is located at the separated position to separate the positioning surface 72CF and the positioning surface 72DF from each other (see FIGS. 6 and 9). In this state, because the imaging plate 10 slides down on the supporting surface 64F due to gravity, the lower edge portion of the imaging plate 10 is in contact with the positioning surface 72CF. The positioning surface 72DF is separated from the positioning surface 72CF by the height of the imaging plate 10 or more, and the imaging plate 10 can fall in between the positioning surfaces 72CF, 72DF to bring the back surface of the imaging plate 10 into surface contact with the supporting surface 64F.

In this state, the positioning surface 72DF moves toward the approach position (positioning surface 72CF). Then, the imaging plate 10 is pressed by the positioning surface 72DF, and the lower edge portion of the imaging plate 10 is pressed against the positioning surface 72CF.

As described above, the positioning surface 72DF forms the angle less than 90° with respect to the supporting surface 64F. Thus, the upper edge portion of the imaging plate 10 is pushed toward the inside of the edge portion and the side of the supporting surface 64F (see an arrow F4).

The positioning surface 72CF is inclined to the side opposite to the positioning surface 72DF, and forms the angle less than 90° with respect to the supporting surface 64F. Thus, the lower edge portion of the imaging plate 10 is pushed toward the side of the supporting surface 64F while being pushed toward the outside of the edge portion by the positioning surface 72DF (see an arrow F3).

That is, the upper and lower edge portions of the imaging plate 10 are tucked between the positioning surfaces 72CF, 72DF, whereby the imaging plate 10 is positioned in the vertical direction. In addition, both edge portions are pressed against the side of the supporting surface 64F by the positioning surfaces 72CF, 72DF. Thus, the upper and lower edge portions of the imaging plate 10 are guided so as to be in contact with the supporting surface 64F without floating from the supporting surface 64F. When a configuration in which the characteristic inclination in which the V-shape is drawn (that is, the surfaces 72CF, 72DF are inclined in the approaching direction as the distance from the supporting surface 64F increases, see FIG. 9) is formed by the positioning surfaces 72CF, 72DF in this manner, the action of pressing the imaging plate 10 against the supporting surface 64F while sandwiching the imaging plate easily works, and the imaging plate 10 can be easily supported to be maintained in the normal posture.

In one embodiment, the positioning holder 72C and the positioning holder 72D are an example of the pair of opening and closing positioning holders. The example in which both of the two opposing surfaces of the pair of opening and closing positioning holders (the positioning holder 72C and the positioning holder 72D) form the positioning surfaces 72CF, 72DF and one (positioning holder 72D) of the pair of opening and closing positioning holders (the positioning holder 72C and the positioning holder 72D) moves to adjust the distance between the pair of opening and closing positioning holders (the positioning holder 72C and the positioning holder 72D) has been described in the above embodiment.

However, one of the opposing surfaces of the positioning holder 72C and the positioning holder 72D may be a positioning surface in the sense of positioning the edge portion of the imaging plate 10 from the outside and pressing the edge portion against the supporting surface 64F. In addition, the distance between the pair of opening and closing positioning holders (the positioning holder 72C and the positioning holder 72D) may be adjusted by both moving.

Instead of moving at least one of the positioning holder 72C and the positioning holder 72D, the stage 60 supporting the imaging plate 10 may move with respect to the positioning holder 72C and the positioning holder 72D. For example, the opposing positioning surfaces 72CF, 72DF may be disposed in the V-shape at an interval, and the stage 60 holding the imaging plate 10 may move in the direction in which the interval is narrowed from the wider side between the positioning surfaces 72CF, 72DF to press both edge portions of the imaging plate 10 against the opposing positioning surfaces 72CF, 72DF. This also allows the imaging plate 10 to be supported between the positioning surfaces 72CF, 72DF to be pressed against the supporting surface 64F.

The pair of positioning holders 72A, 72B and the pair of positioning holders 72C, 72D open and close in directions different from each other, so that the imaging plate 10 can be positioned and sandwiched in two different directions. Therefore, the pair of positioning holders 72A, 72B is an example of the pair of first opening and closing positioning holders, and the pair of positioning holders 72C, 72D is an example of the pair of second opening and closing positioning holders.

It is not essential that the positioning surfaces 72BF, 72CF, 72DF are plane or flat. That is, the positioning surfaces 72BF, 72CF, 72DF are provided so as to protrude from the supporting surface 64F by at least the thickness dimension of the imaging plate 10, and may have the shape including the guide positioning surface formed in the shape toward the direction covering the supporting surface 64F as being separated from the supporting surface 64F. Furthermore, the positioning surfaces 72BF, 72CF, 72DF may be formed in the shape including the guide surface in which the angle with respect to the supporting surface 64F is less than 90°. Various modifications related to the positioning surfaces 72AF, 72BF, 72CF, 72DF will be described later.

<Drive Mechanism of Positioning Holder>

The positioning holder 72B, the positioning holder 72C, and the positioning holder 72D may be driven by any configuration. For example, the positioning holder 72B, the positioning holder 72C, and the positioning holder 72D may be driven using a force driving the stage 60. The positioning holder 72B, the positioning holder 72C, and the positioning holder 72D may be implemented by a drive portion (for example, a motor and a solenoid actuator) different from the drive portion such as a motor that drives the stage 60.

In one embodiment, the positioning holder 72B, the positioning holder 72C, and the positioning holder 72D are driven using the force driving the stage 60, and a configuration therefor will be described below.

<Configuration moving positioning holder 72B>

The configuration moving the positioning holder 72B will be described. As illustrated in FIGS. 2 to 4 and 6 to 8, the positioning holder 72B is supported so as to be movable between the separated position and the approach position with respect to the stage body 61. The moving direction of the positioning holder 72B in the stage body 61 is the same as the moving direction of the stage body 61 along the main scanning direction A1. Thus, the positioning holder 72B is an example of the first movable positioning holder supported movably with respect to the stage body 61 along the moving direction of the stage 60.

The positioning holder 72B is constantly biased in the closing direction, namely, from the separated position toward the approach position by a biasing portion 72Bs. In one embodiment, the biasing portion 72Bs is a coil spring bridged between the end portion of the positioning holder 72B on the side of the positioning holder 72A and the back side portion of the slit 65 in an extended state on the back surface side of the plate portion 64 (see FIGS. 2, 6, 7, and 8). The positioning holder 72B is constantly biased from the separated position toward the approach position by the contraction force of the coil spring as the biasing portion 72Bs.

A trigger portion 72Bq is integrally formed with the positioning holder 72B. The trigger portion 72Bq is provided in a portion of the positioning holder 72B facing the side opposite to the supporting surface 64F. Here, the trigger portion 72Bq is provided at the intermediate portion in the longitudinal direction of the positioning holder 72B. The trigger portion 72Bq protrudes from the back surface of the plate portion 64. Regardless of the position of the stage 60, the trigger portion 72Bq can be positioned between the pair of side plates 42. The trigger portion 72Bq can receive the force moving the stage 60 by being in contact with one side plate 42 that is an example of the fixed disposition portion in at least a part of the movement path of the stage 60.

In the state where the stage 60 is located at the setting position P1, the trigger portion 72Bq comes into contact with the inclined side portion of the one side plate 42 from the side of the reading position P2. Thus, the trigger portion 72Bq is pushed toward the opening side of the slit 65 against tensile force by the biasing portion 72Bs, and the positioning holder 72B is kept at the separated position (see FIGS. 2 and 4). That is, the pair of positioning holders 72A, 72B is kept in the open state.

In the state where the stage 60 is located at the reading position P2, the contact state between the trigger portion 72Bq and the one side plate 42 is released. Thus, the positioning holder 72B is biased toward the back side of the slit 65, namely, toward the approach position by the tensile force of the biasing portion 72Bs (see FIGS. 3 and 7). Thus, the pair of positioning holders 72A, 72B is kept in the state of tucking in the side edge portions of the two opposing portions of the imaging plate 10.

In at least some sections (initial sections) in which the stage 60 moves from the setting position P1 to the reading position P2, the stage 60 moves toward the reading position P2 while the trigger portion 72Bq is pressed toward the one side plate 42 by the tensile force of the biasing portion 72Bs. When considering the stage body 61 as a reference, the positioning holder 72B gradually moves toward the approach position according to the movement of the stage body 61. Thus, the pair of positioning holders 72A, 72B is closed. The one side plate 42 is an example of the fixed disposition portion disposed at the fixed position during the movement of the stage 60.

At this point, when the imaging plate 10 does not exist between the pair of positioning holders 72A, 72B, the positioning holder 72B moves to the approach position. When the imaging plate 10 exists between the pair of positioning holders 72A, 72B, the positioning holder 72B moves toward the approach position until the movement of the positioning holder 72B is regulated by tucking the imaging plate 10 between the pair of positioning surfaces 72AF, 72BF. In this state, the imaging plate 10 is tucked between the pair of positioning surfaces 72AF, 72BF by the biasing force of the biasing portion 72Bs. In this manner, the trigger portion 72Bq is moved with respect to the stage body by the force of moving the stage 60, whereby the trigger portion 72Bq allows the positioning holder 72B to move to the approach position, thereby causing the positioning holder 72B to perform the opening operation.

Contrary to the above, in at least a part of the section (later section) in which the stage 60 moves from the reading position P2 toward the setting position P1, the stage body 61 moves toward the setting position P1 while the positioning holder 72B is maintained at the fixed position with respect to the one side plate 42 by the contact between the trigger portion 72Bq and the one side plate 42. When considering the stage body 61 as the reference, the positioning holder 72B gradually moves toward the separated position according to the movement of the stage body 61 against the biasing force of the biasing portion 72Bs. Thus, the holding of the imaging plate 10 between the pair of positioning holders 72A, 72B is released. That is, the pair of positioning holders 72A, 72B is opened. In this manner, the trigger portion 72Bq moves the positioning holder 72B toward the separated position by the force of moving the stage 60, thereby causing the positioning holder 72B to perform the opening operation.

In one embodiment, the stage 60 is movable to the eject position P3 that is further away from the setting position P1 (to the side opposite to the reading position P2). When the stage 60 moves to the eject position P3 while the trigger portion 72Bq is in contact with the side plate 42, the positioning holder 72B can move to a separation eject position farther away from the positioning holder 72A than the separated position.

In one embodiment, a positioning holder operating mechanism closing the pair of positioning holders 72A, 72B according to the movement of the stage 60 from the setting position P1 to the reading position P2 is implemented by the configuration in which the biasing portion 72Bs biases the positioning holder 72B in the closing direction and the configuration in which the trigger portion 72Bq comes into contact with the side plate 42 in the middle of the movement of the stage 60.

The positioning holder operating mechanism does not need to perform the closing operation of the pair of positioning holders 72A, 72B by receiving the force by which the stage 60 moves, and for example, the closing operation may be performed by driving a motor, a solenoid actuator, or the like different from the stage moving mechanism 50 based on the control of the controller 100 (see FIG. 5).

<Configuration Moving Positioning Holder 72D>

A configuration moving the positioning holder 72D will be described.

As illustrated in FIGS. 2 to 4, 6, 7, and 9, the positioning holder 72D is supported so as to be movable between the separated position and the approach position with respect to the stage body 61. The moving direction of the positioning holder 72D in the stage body 61 is along the sub-scanning direction A2 intersecting the moving direction of the stage body 61 along the main scanning direction A1. Thus, the positioning holder 72D is an example of the second movable positioning holder movably supported with respect to the stage body 61 along the direction intersecting the moving direction of the stage 60.

The coupling extension portion 72Db of the positioning holder 72D extends from the positioning body portion 72Da toward the movable support 62 along the main scanning direction A1. The lower portion of the movable support 62 is fixed to the back surface side of the plate portion 64, and the gap is provided between the upper portion of the movable support 62 and the upper portion of the plate portion 64. The coupling extension portion 72Db extends toward the gap between the upper portion of the movable support 62 and the upper portion of the plate portion 64 (see FIG. 7).

A slit 68 extending downward from the upper edge portion of the plate portion 64 is formed in the portion of the plate portion 64 corresponding to the distal end of the coupling extension portion 72Db. An auxiliary guide portion 72Dc is fixed to the distal end of the coupling extension portion 72Db by screwing or the like. Both ends of the auxiliary guide portion 72Dc are in contact with both side edge portions of the slit 68 from the front side of the plate portion 64. The coupling extension portion 72Db itself is in contact with the plate portion 64 from the back surface side. Therefore, the distal end of the coupling extension portion 72Db is movably supported along the sub-scanning direction A2 intersecting the main scanning direction A1 while being guided by the slit 68 (see FIGS. 6 and 7).

The positioning holder 72D is constantly biased toward the closing direction, namely, from the separated position toward the approach position by the biasing portion 72Ds. In one embodiment, the biasing portion 72Ds is a coil spring bridged between the distal end of the coupling extension portion 72Db and the back side portion of the slit 68 in an extended state on the back surface side of the plate portion 64 (see FIGS. 4, 6, and 7). The positioning holder 72D is constantly biased from the separated position toward the approach position by the contraction force of the coil spring as the biasing portion 72Ds.

A roller 72Dq is integrally combined with the positioning holder 72D. At this point, the roller 72Dq is rotatably supported by the distal end of the coupling extension portion 72Db facing the opposite side to the supporting surface 64F. The rotation axis of the roller 72Dq is a direction orthogonal to the main scanning direction A1 and the sub-scanning direction A2. The roller 72Dq is disposed on the back side of the back surface of the plate portion 64. Regardless of the position of the stage 60, the roller 72Dq can be positioned between the pair of side plates 42.

Figure 11:
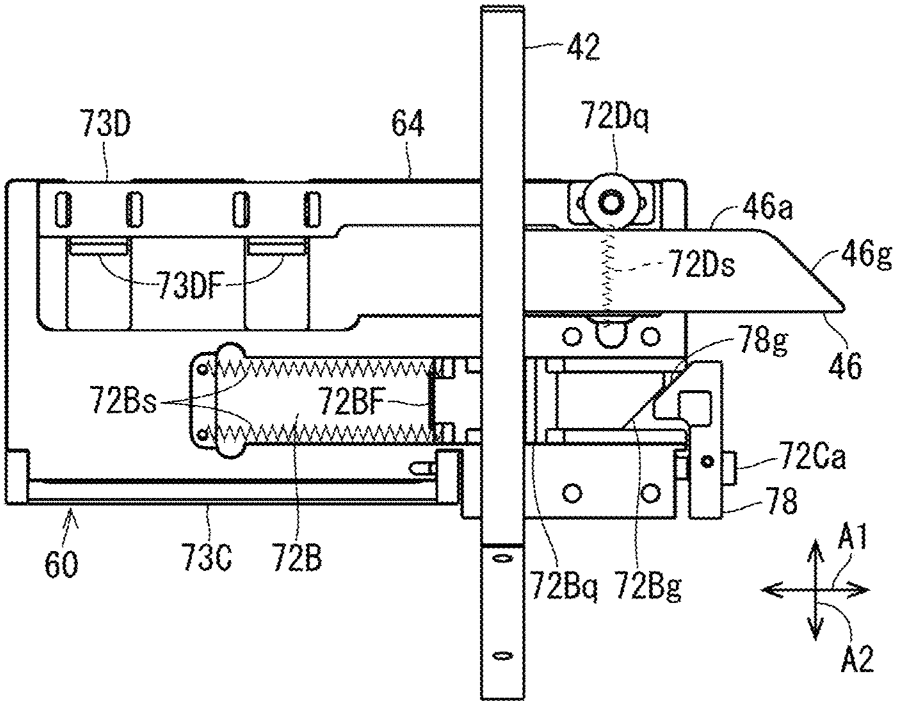

The actuation piece 46 that can come into contact with the roller 72Dq is provided in one side plate 42 (see also FIG. 11). The actuation piece 46 is formed in an elongated plate shape extending from a part of the bottom of the recess 42*g* of the one side plate 42 toward the other side plate 42. The actuation piece 46 is located in the middle of a movement locus of the roller 72Dq accompanying the movement of the stage 60. The distal end of the actuation piece 46 is formed in an inclined surface 46*g* inclined obliquely with respect to the moving direction of the stage 60. At this point, the inclined surface 46*g* that is inclined is formed in a shape that is directed upward toward the setting position P1 along the moving direction of the stage 60. An upward surface 46*u* of the actuation piece 46 is formed in a shape along the moving direction of the stage 60. The actuation piece 46 is an example of the fixedly disposition portion disposed at a fixed position during the movement of the stage 60.

The roller 72Dq can be an element of the trigger portion that can receive force for moving the stage 60 by coming into contact with the actuation piece 46 that is the fixedly disposition portion in at least a part of the movement path of the stage 60.

In the state where the stage 60 is located at the setting position P1, the roller 72Dq comes into contact with the upward surface 46*u* of the actuation piece 46 from above. Thus, the roller 72Dq is maintained in the state of being lifted upward against the tensile force by the biasing portion 72Ds, and the positioning holder 72D is maintained at the separated position (see FIGS. 2 and 4). That is, the pair of positioning holders 72C, 72D is kept in the open state.

In the state where the stage 60 is located at the reading position P2, the roller 72Dq is separated from the distal end side of the actuation piece 46 and is in a non-contact state with the actuation piece 46. Then, the coupling extension portion 72Db is pulled downward by the tensile force of the biasing portion 72Ds, and the positioning holder 72D is biased toward the approach position (see FIGS. 3 and 7). Thus, the pair of positioning holders 72C, 72D tucks the upper and lower side edge portions opposite to each other in the imaging plate 10.

In the initial section that is at least a part of the section in which the stage 60 moves from the setting position P1 to the reading position P2, the roller 72Dq is kept in contact with the upward surface 46*u* of the actuation piece 46. Therefore, the stage 60 moves toward the reading position P2 while the positioning holder 72D is kept at the separated position.

The roller 72Dq reaches the inclined surface 46*g* while the stage 60 is moving from the setting position P1 toward the reading position P2. Then, the roller 72Dq gradually descends along the inclined surface 46*g* with the movement of the stage 60 by the biasing force of the biasing portion 72Ds. As a result, the positioning holder 72D moves toward the approach position, and the pair of positioning holders 72C, 72D is closed.

At this time, when the imaging plate 10 does not exist between the pair of positioning holders 72C, 72D, the positioning holder 72D moves to the approach position. In the case where the imaging plate 10 exists between the pair of positioning holders 72C, 72D, the positioning holder 72D moves toward the approach position until the movement of the positioning holder 72C is restricted by tucking the imaging plate 10 between the pair of positioning surfaces 72CF, 72DF. In this state, the imaging plate 10 is tucked between the pair of positioning surfaces 72CF, 72DF by the biasing force of the biasing portion 72Ds. In this manner, the roller 72Dq receives the force moving the stage 60, and is changed to the state in which the movement of the positioning holder 72D is allowed to the approach position, thereby causing the opening operation to be performed.

The opening and closing timing of the pair of positioning holders 72A, 72B and the opening and closing timing of the pair of positioning holders 72C, 72D may be set such that the pair of upper and lower positioning holders 72C, 72D tucks the imaging plate 10 after the pair of positioning holders 72A, 72B in the horizontal direction tucks the imaging plate 10. For example, after the trigger portion 72Bq is separated from the side plate 42 to move the positioning holder 72B toward the approach position while the stage 60 is moving toward the reading position P2, the roller 72Dq may reach the inclined surface 46*g* and the positioning holder 72D may be set to face the approach position. In one embodiment, by stretching the actuation piece 46 from one side plate 42 toward the other side plate 42, the timing at which the roller 72Dq reaches the inclined surface 46*g* is delayed when the stage 60 moves toward the reading position P2, thereby delaying the timing at which the positioning holder 72D moves toward the approach position.

By setting as described above, the imaging plate 10 is accurately positioned with respect to the stage 60. That is, in the state where the imaging plate 10 falls on the stage 60, the imaging plate 10 is positioned in the vertical direction by sliding onto the positioning surface 72CF by its own weight. On the other hand, a degree of freedom of the position of the imaging plate 10 is large in a left-right direction. Accordingly, the imaging plate 10 that is not tucked by the pair of positioning holders 72C, 72D is positioned in the left-right direction by the pair of positioning holders 72A, 72B. Thereafter, the imaging plate 10 is tucked in the vertical direction by the pair of positioning holders 72C, 72D. Thus, the imaging plate 10 is accurately positioned with respect to the stage 60 in both the vertical and left-right directions.

Contrary to the above, in a later section that is at least a part of the section in which the stage 60 moves from the reading position P2 toward the setting position P1, when the roller 72Dq and the inclined surface 46*g* of the actuation piece 46 come into contact with each other, the roller 72Dq moves upward along the inclined surface 46*g*. Thus, the positioning holder 72D moves toward the separated position. When considering the stage body 61 as the reference, the positioning holder 72D gradually moves toward the separated position according to the movement of the stage body 61 against the biasing force of the biasing portion 72Ds. Thus, the holding of the imaging plate 10 between the pair of positioning holders 72C, 72D is released. That is, in at least a part of the section in which the stage 60 moves from the reading position P2 to the setting position P1, the roller 72Dq comes into contact with the inclined surface 46*g* to move the positioning holder 72D along the direction intersecting the moving direction of the stage 60, thereby operating the pair of opening and closing positioning holders 72C, 72D. When the roller 72Dq reaches the upward surface 46*u* of the actuation piece 46, the roller 72Dq moves on the upward surface 46*u*. For this reason, the positioning holder 72D is maintained at the separated position.

In this manner, the roller 72Dq receives the force moving the stage 60 to move the positioning holder 72D toward the separated position, thereby causing the positioning holder 72D to perform the opening operation.

In one embodiment, the positioning holder operating mechanism that closes the pair of positioning holders 72A, 72B according to the movement of the stage 60 from the setting position P1 to the reading position P2 is implemented by the configuration in which the biasing portion 72Ds biases the positioning holder 72D in the closing direction and the configuration in which the roller 72Dq comes into contact with the actuation piece 46 in the middle of the movement of the stage 60.

The positioning holder operating mechanism does not need to perform the closing operation of the pair of positioning holders 72C, 72D by receiving the force by which the stage 60 moves, and for example, the closing operation may be performed by driving a motor or a solenoid actuator different from the stage moving mechanism 50 based on the control of the controller 100 (see FIG. 5).

It is not necessary that both the positioning holder 72C and the positioning holder 72D have the positioning surface in the sense of positioning the edge portion of the imaging plate 10 from the outside and pressing the edge portion against the supporting surface 64F. For example, one of the positioning holder 72C and the positioning holder 72D may have the surface that extends perpendicularly from the supporting surface 64F and positions the edge portion of the imaging plate 10 from the outside of the imaging plate 10, but does not have the function of pressing toward the supporting surface 64F. Even in this case, the other of the positioning holder 72C and the positioning holder 72D can position the edge portion of the imaging plate 10 from the outside of the imaging plate 10 and press the edge portion toward the supporting surface 64F.

When at least one of the pair of right and left positioning holders 72A, 72B has the function of pressing the edge portion of the imaging plate 10 against the supporting surface 64F, there is no need for the pair of right and left positioning holders 72C, 72D to press the edge portion of the imaging plate 10 against the supporting surface 64F. In this case, the pair of positioning holders 72C, 72D positions the edge portion of the imaging plate 10 from the outside of the imaging plate 10, but may have a surface having no function of pressing the edge portion toward the supporting surface 64F, for example, the surface perpendicular to the supporting surface 64F. Furthermore, in this case, the upper positioning holder 72D may be omitted, and the lower positioning holder 72C may support the edge portion of the imaging plate 10 from below to perform the positioning in the vertical direction.

As described above, the two types of positioning holders 72A, 72B (the positioning in the main scanning direction A1) and 72C, 72D (the positioning in the sub-scanning direction A2) having different directions have been described. The configuration of the positioning holder operating mechanism is not limited to the above. In order to reliably maintain the normal posture of the imaging plate, the above configuration can be used, and at least the positioning in the sub-scanning direction (the positioning using the positioning holders 72D, 72C in one embodiment) is included. In paragraph 0149, the positioning with high accuracy has been described, but the description will be further added. In the case that the imaging plate is largely deflected (curved) during X-ray imaging of a tooth (or teeth) using the imaging plate, it is important that the latent image of the imaging plate is read with the deflection reduced in order to obtain the clear and fine image data. Accordingly, the order of the positioning is correction (in one embodiment, the positioning moving the positioning holder 72D) of contact with the short side of the imaging plate after the correction (in one embodiment, the positioning for moving the positioning holder 72B) of contact with the long side of the imaging plate. The large deflection generated in the imaging plate is first corrected by the positioning holder 72D and the positioning surface 72DF, so that the imaging plate can be easily and reliably tucked by the positioning in the sub-scanning direction A2 (the positioning by the positioning holders 72D, 72C) and the subsequent positioning in the main scanning direction A1 (the positioning by the positioning holders 72B, 72A).

<Configuration Moving Positioning Holder 72C>

Figure 10:
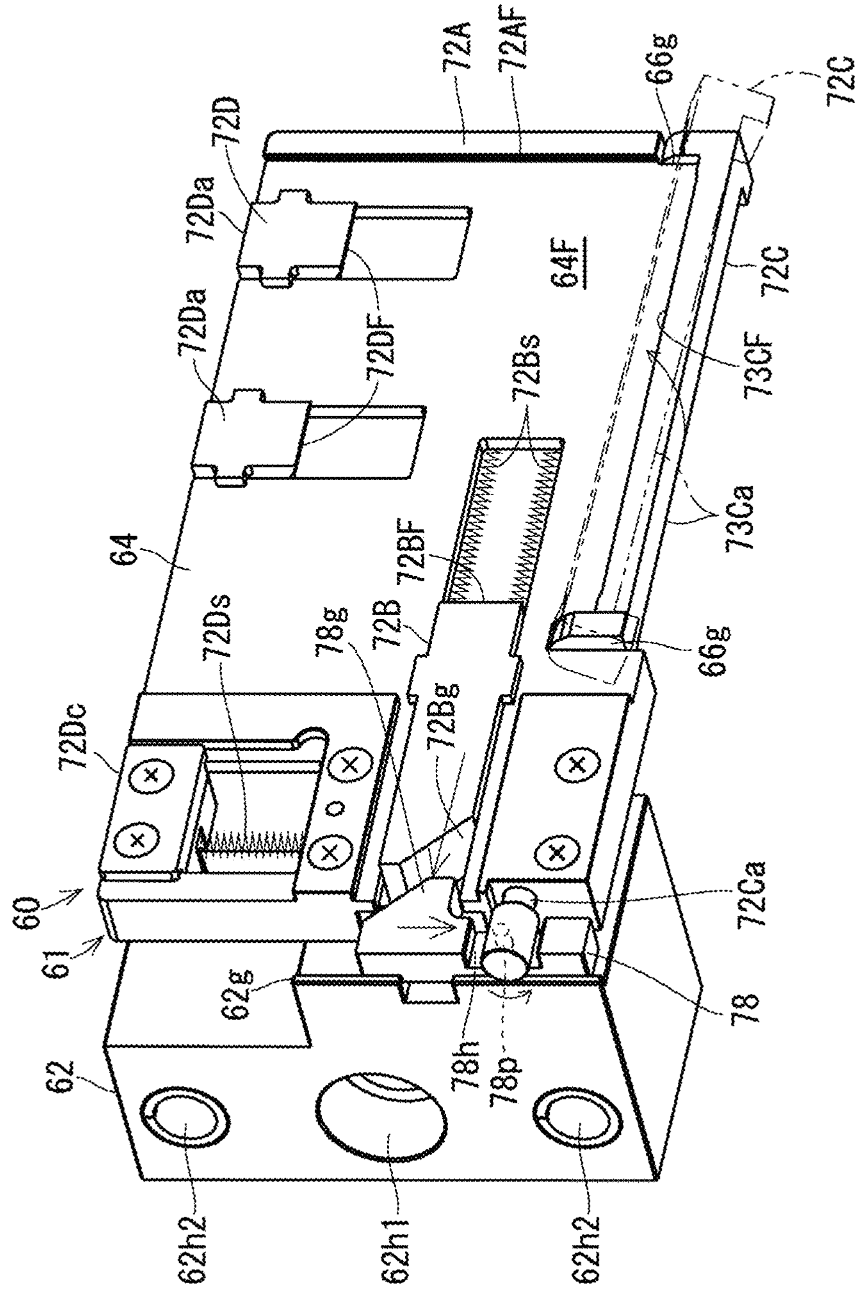
FIG. 10 is a perspective view illustrating the stage.

A configuration moving the positioning holder 72C will be described. FIG. 10 is a perspective view illustrating the stage 60. In FIGS. 9 and 10, the positioning holder 72C located at the contact position is indicated by a solid line, and the positioning holder 72C located at the retreat position is indicated by a two-dot chain line.

As illustrated in FIGS. 9 and 10, the positioning holder 72C is movably supported between the contact position and the retreat position. Furthermore, the positioning holder 72C is biased toward the contact position by the biasing portion 72Cs. For example, the biasing portion 72Cs is a torsion coil spring. For example, such the torsion coil spring is attached to a shaft portion that rotatably supports the positioning holder 72C, one end of the torsion coil spring is connected to the plate portion 64, and the other end portion is connected to the positioning holder 72C, whereby the positioning holder 72C is biased toward the contact position. In the state where the stage 60 is located at the setting position P1 and the reading position P2, the stage 60 is maintained the contact position by the biasing force of the biasing portion 72Cs.

An extension shaft portion 72Ca extending from one end of the positioning holder 72C penetrates a portion of the plate portion 64 on the side of the movable support 62 to protrude to the side surface of the plate portion 64. The extension shaft portion 72Ca is provided so as not to be relatively rotatable with respect to the positioning holder 72C, and rotates together with the positioning holder 72C.

When the stage 60 moves from the setting position P1 to the eject position P3, the positioning holder 72B further moves away from the positioning holder 72A from the separated position. Then, the force moving the positioning holder 72B is transmitted to the extension shaft portion 72Ca through a relay piece 78. Thus, the extension shaft portion 72Ca rotates, and the positioning holder 72C can rotate from the contact position to the retreat position against the biasing force of the biasing portion 72Cs. That is, the force moving the stage 60 from the setting position P1 to the eject position P3 is transmitted as the force moving the positioning holder 72C from the contact position to the retreat position through the positioning holder 72B and the relay piece 78.

More specifically, the relay piece 78 is movably supported by a portion of the stage body 61 on the side of movable support 62. The moving direction of the relay piece 78 is a direction intersecting the moving direction of the positioning holder 72B, in this case, the sub-scanning direction A2.

The relay piece 78 is formed in an elongated shape. On the surface of the movable support 62 on the side to which the plate portion 64 is fixed, a guide protrusion **62*g* extending along the sub-scanning direction A2 is formed at the position away from the side surface of the plate portion 64. The relay piece 78 is movably supported in a space surrounded by the surface of the movable support 62 on the side to which the plate portion 64 is fixed, the guide protrusion 62*g*, the side surface of the plate portion 64, and the extension shaft portion 72**Ca.

A slope 72Bg inclined upward in the direction in which the positioning holder 72B moves to the separated position is formed at the end of the positioning holder 72B on the side opposite to the positioning surface 72BF. The upper end of the relay piece 78 is opposite to the slope 72Bg. A slope **78*g* inclined upward in the direction in which the positioning holder 72B moves to the separated position is formed at this end. The slope 72Bg and the slope 78*g* may have a positional relationship parallel to each other. In the state where the positioning holder 72B is located at the approach position, the gap is provided between the slope 72Bg and the slope 78*g*. In the state where the positioning holder 72B is located at the separated position, the (slight) gap is provided between the slope 72Bg and the slope 78*g*, or the slope 72Bg and the slope 78*g* start to contact each other. When the positioning holder 72B further moves away from the separated position with respect to the positioning holder 72A, the slope 72Bg pushes the slope 78*g* to push the relay piece 78** downward.

The longitudinal intermediate portion of the relay piece 78 intersects the extension shaft portion 72Ca. A recess **78*h* is formed in a portion of the relay piece 78 intersecting the extension shaft portion 72Ca. The end of the relay piece 78 is disposed in the recess 78*h*. For this reason, the movable range of the relay piece 78 is restricted to a range in which the end of the extension shaft portion 72Ca can move in the recess 78***h*.

A pin-shaped portion 78*p* protrudes from the bottom of the recess 78*h*. A recess into which the pin-shaped portion 78*p* is fitted is formed at the end of the extension shaft portion 72Ca. The pin-shaped portion 78*p* is fitted into the recess of the extension shaft portion 72Ca, while the extension shaft portion 72Ca is disposed in the recess 78*h*. In this state, the gap is formed between the extension shaft portion 72Ca and the inner peripheral surface of the recess of the extension shaft portion 72Ca in the pin-shaped portion 78*p*.

In the normal state, the positioning holder 72C is constantly biased toward the contact position by the biasing force of the biasing portion 72Cs. The biasing force rotationally biases the extension shaft portion 72Ca, and the biasing force causes the recess formed in the extension shaft portion 72Ca to face obliquely upward in the recess 78*h*. Thus, the pin-shaped portion 78*p* is lifted upward, and the relay piece 78 is lifted upward. In the state in which the positioning holder 72B exists at the separated position or at the position closer than the separated position, the relay piece 78 is located closer to the upper side by the biasing force of the biasing portion 72Cs.

When the positioning holder 72B moves in the direction away from the positioning holder 72A than the separated position, the slope 72Bg pushes the slope 78*g*. Thus, the relay piece 78 is pushed down. Then, because the pin-shaped portion 78*p* is also lowered, the recess of the extension shaft portion 72Ca to which the pin-shaped portion 78*p* is fitted faces obliquely downward. Thus, the extension shaft portion 72Ca rotates, and the positioning holder 72C rotationally moves from the contact position to the retreat position against the biasing force of the biasing portion 72Cs. Then, the imaging plate 10 supported on the positioning surface 72CF is ejected through the gap between the supporting surface 64F and the positioning surface 72CF.

When the positioning holder 72C returns to the separated position, the positioning holder 72C returns from the retracted position to the contact position by the biasing force of the biasing portion 72Cs to return to the normal state.

In one embodiment, the positioning holder 72 is moved between the contact position and the retreat position by the force of the movement of the stage 60, but this is not always necessary. Under the control of the controller 100, a drive portion (for example, a motor and a solenoid actuator) different from the drive portion such as a motor that moves the stage 60 may be operated to move the positioning holder 72C.

<Operation>

An operation example of the scanner 20 will be described.

In the initial state, the stage 60 is located at the setting position P1 (see FIGS. 2 and 4). In this state, as illustrated in FIG. 11, since the trigger portion 72Bq of the positioning holder 72B is in contact with one side plate 42, the positioning holder 72B is located at the separated position (see FIGS. 6 and 10). Thus, the pair of positioning holders 72A, 72B is in the open state. Furthermore, because the roller 72Dq is in contact with the upward surface 46*u* of the actuation piece 46, the positioning holder 72D is located at the separated position (FIGS. 6 and 10). Furthermore, the positioning holder 72C is located at the contact position by the biasing force of the biasing portion 72Cs (see FIGS. 9 and 10). FIG. 11 illustrates the stage 60 as viewed from the back surface side while the stage 60 is located at the setting position P1.

In this state, the imaging plate 10 is inserted into the slit 68 in the setting portion 31 (see FIGS. 4 and 5). The imaging plate 10 reaches the supporting surface 60F of the stage 60 while being guided by the IP guiding surface 31GS. The lower edge portion of the imaging plate 10 slides down the supporting surface 64F and is placed on the lower positioning holder 72C. In addition, the imaging plate 10 is inclined so as to fall onto the side of the supporting surface 64F, and the back surface of the imaging plate 10 is opposite to (facing) the supporting surface 64F.

When the instruction for reading by the scanner 20 is input, the stage 60 moves from the setting position P1 toward the reading position P2 by the driving of the stage moving mechanism 50. As illustrated in FIG. 12, as the stage 60 moves with respect to the side plate 42, the side plate 42 in contact with the trigger portion 72Bq relatively moves toward the side of the positioning holder 72A, so that the movement of the positioning holder 72B toward the side of the positioning holder 72A is allowed. Then, by the biasing force of the biasing portion 72Bs, the positioning holder 72B moves relative to the plate portion 64 to approach the positioning holder 72A. During the movement of the positioning holder 72B, when the positioning surface 72BF comes into contact with the side edge portion on one side of the imaging plate 10, the imaging plate 10 is pushed toward the opposite positioning surface 72AF. When the imaging plate 10 slides and moves on the lower positioning surface 72CF and when the side edge portion on the opposite side of the imaging plate 10 comes into contact with the positioning surface 72AF, the pair of positioning surfaces 72AF, 72BF tucks both the side edge portions of the imaging plate 10 from both the right and left sides. Because the pair of positioning surfaces 72AF, 72BF forms the angle less than 90° with respect to the supporting surface 64F, the pair of positioning surfaces 72AF, 72BF press both the side edge portions of the imaging plate 10 toward the supporting surface 64F while positioning the imaging plate 10 in the left-right direction (see FIG. 8).

As illustrated in FIG. 12, in the middle of the stage 60 reaching the reading position P2 from the setting position P1, the roller 72Dq reaches the inclined surface 46*g* from the upward surface 46*u* of the actuation piece 46. Then, the positioning holder 72D becomes movable from the separated position to the approach position. Because the positioning holder 72D is biased toward the approach position by the biasing force of the biasing portion 72Ds, the roller 72Dq descends along the inclined surface 46*g* with the movement of the stage 60, and the positioning holder 72D moves toward the approach position. When the positioning surface 72DF comes into contact with the upper edge portion of the imaging plate 10 during the movement of the positioning holder 72D, the lower edge portion of the imaging plate 10 is pushed toward the lower positioning surface 72CF. Thus, the pair of positioning surfaces 72CF, 72DF tucks the upper and lower edge portions of the imaging plate 10 from the upper and lower sides. Since the pair of positioning surfaces 72CF, 72DF forms the angle less than 90° with respect to the supporting surface 64F, the pair of positioning surfaces 72CF, 72DF presses both the upper and lower edge portions of the imaging plate 10 toward the supporting surface 64F while positioning the imaging plate 10 in the vertical direction (see FIG. 9).

Because of this, the imaging plate 10 is held while the upper, lower, left, and right edge portions of the imaging plate 10 are pressed against the supporting surface 64F at fixed positions. In this state, the stage 60 reaches the reading position P2, and the reading unit 90 reads the latent image of the imaging plate 10 at the reading position P2.

After the reading by the reading unit 90 is completed, the stage 60 returns to the setting position P1. During the movement, the operation opposite to the above is performed, and the holding of the imaging plate 10 on the stage 60 is released.

That is, in the middle of the stage 60 returning from the reading position P2 to the setting position P1, the roller 72Dq comes into contact with the inclined surface 46*g* of the actuation piece 46. As the stage 60 moves, the roller 72Dq moves upward along the inclined surface 46*g*, and the positioning holder 72D moves to the separated position (see FIG. 10). The state in which the positioning holder 72D moves to the separated position while the stage 60 is located at the setting position P1 and the eject position P3 is maintained as the roller 72Dq moves along the upward surface 46*u* of the actuating piece.

Furthermore, in the middle of the stage 60 returning from the reading position P2 to the setting position P1, the trigger portion 72Bq comes into contact with one side plate 42 (see FIG. 10). When the stage 60 moves while the trigger portion 72Bq is in contact with the one side plate 42 to regulate the position of the stage 60, the positioning holder 72B moves toward the separated position. Even when the stage 60 reaches the setting position P1, the trigger portion 72Bq is kept in contact with the side plate 42, so that the positioning holder 72B is kept at the separated position.

In this state, the positioning holder 72B moves in the direction away from the positioning holder 72A along the main scanning direction A1, the distance between the pair of positioning holders 72A, 72B increases, and the state in which the imaging plate 10 is tucked in the main scanning direction A1 is released. Furthermore, the positioning holder 72D moves in the direction away from the positioning holder 72C along the sub-scanning direction A2, the distance between the pair of positioning holders 72C, 72D increases, and the state in which the imaging plate 10 is tucked in the sub-scanning direction A2 is released.

When the stage 60 moves from the setting position P1 toward the eject position P3, the slope 72Bg of the positioning holder 72C comes into contact with the slope 78*g* of the relay piece 78 to press down the relay piece 78 (see FIG. 10). Thus, the extension shaft portion 72Ca rotates to rotate the positioning holder 72C. Then, the positioning surface 72CF moves from the contact position to the retreat position, and the imaging plate 10 supported on the positioning surface 72CF passes through the gap between the supporting surface 64F and the positioning surface 72CF and is ejected to the outlet port 32 (see FIGS. 4 and 5).

Thereafter, the stage 60 returns from the eject position P3 to the setting position P1. Then, the positioning holder 72C rotationally moves such that the positioning surface 72CF returns to the contact position by the biasing force of the biasing portion 72Cs. In this state, as described above, the imaging plate 10 can be set on the stage 60 at the setting position P1.

<Effect>

According to the radiation image scanner 20 configured as described above, the edge portion of the imaging plate 10 comes into contact with the positioning surfaces 72AF, 72BF, 72CF, 72DF, so that the imaging plate 10 is maintained in the normal posture. Furthermore, the edge portion of the imaging plate is pressed against the supporting surface by the positioning surface. As a result, the imaging plate 10 can be held in the normal posture while being in contact with the supporting surface.

When it is attempted that the imaging plate 10 is held by being attracted by magnetic force or the like on the stage 60, there is a possibility that the imaging plate 10 is inclined on the stage 60. Alternatively, when the imaging plate 10 is accidentally disposed at the position where magnetic force does not act, there is a possibility that the imaging plate 10 falls off from the stage. In addition, when it is attempted that the imaging plate 10 is held only with the positioning surface perpendicular to the supporting surface 64F, there is a possibility that the imaging plate 10 partially floats off of the supporting surface 64F in the case where the imaging plate 10 is curved (deflected) in a warped manner. In such the case, because the distance from each portion of the reading surface of the imaging plate 10 and the reading unit 90 varies, there is a possibility that the read image is blurred. At this point, generation of the deflection of the imaging plate will be additionally described. In the X-ray imaging of the tooth (or teeth) using the imaging plate, the imaging plate is inserted into an oral cavity of a person or animal that is a capturing target. At this time, because the imaging plate is required to be caused to follow a dentition forming a curve depending on an imaging method and imaging means, the imaging plate is sometimes deflected from a flat state before being used for capturing the image due to an external force received in the oral cavity at that time. The deflection of the imaging plate caused by an external force applied to the imaging plate when the imaging plate is set in the oral cavity becomes sometimes a barrier for fine reading of the captured image.

According to the scanner 20, the imaging plate 10 is held on the stage 60 in the normal posture while being in surface contact with the supporting surface 64F, so that the radiation image can be clearly read in the predetermined normal posture.

In addition, because the positioning mechanism 70 includes the positioning surfaces 72AF, 72BF, 72CF, 72DF provided so as to protrude from the supporting surface 64F by at least the thickness dimension of the imaging plate 10 and formed in the shape toward the direction covering the supporting surface 64F as being away from the supporting surface 64F as the positioning surface, the positioning surfaces 72AF, 72BF, 72CF, 72DF are relatively pressed against the edge portion of the imaging plate 10, whereby the edge portion of the imaging plate 10 is pressed against the supporting surface 64F while being positioned in the supporting surface 64F.

For example, when the positioning surfaces 72AF, 72BF, 72CF, 72DF include the guide surface having the angle less than 90° with respect to the supporting surface 64F, the edge portion of the imaging plate 10 is smoothly pressed against the supporting surface using the inclination of the guide surface.

In addition, the positioning mechanism 70 includes the pair of positioning holders 72A, 72B (or the pair of positioning holders 72C, 72D) as the pair of opening and closing positioning holders, and the distance between the pair of positioning holders 72A, 72B (or the pair of positioning holders 72C, 72D) is adjusted by the movement of at least one of the positioning holders 72A, 72B. Thus, the imaging plate 10 is easily disposed between the pair of positioning holders 72A, 72B (or the pair of positioning holders 72C, 72D) while the pair of positioning holders 72A, 72B are in the opened state. In this state, when the pair of positioning holders 72A, 72B (or the pair of positioning holders 72C, 72D) is closed so as to reduce the interval, the edge portions of the two opposing positions of the imaging plate 10 are tucked between the two opposing positioning surfaces 72AF, 72BF (or the pair of positioning holders 72C, 72D) of the pair of positioning holders 72A, 72B (or a pair of positioning surfaces 72CF, 72DF), the imaging plate 10 is maintained in the normal posture, and the imaging plate 10 comes into contact with the supporting surface 64F.

In addition, the imaging plate 10 in which the pair of positioning holders 72A, 72B (or the pair of positioning holders 72C, 72D) is open can be easily set at the setting position P1 by closing the pair of positioning holders 72A, 72B (or the pair of positioning holders 72C, 72D) as the stage 60 moves from the setting position P1 to the reading position P2. Because the stage 60 is moved to the reading position P2 after the imaging plate 10 is set, the imaging plate 10 is held in the normal posture while being in contact with the supporting surface 64F, and can be stably held even when a part of the device moves.

In addition, the pair of positioning holders 72C, 72D includes the positioning holder 72C as the displacing positioning holder capable of changing the position between the contact position and the retreat position. For this reason, the imaging plate 10 can be easily detached from the stage 60 by moving the positioning holder 72C to the retreat position.

The stage 60 is movable between the setting position P1 and the eject position P3, the positioning holder 72C is located at the contact position when the stage 60 is located at the setting position P1, and the positioning holder 72C is moved to the eject position when the stage 60 is located at the eject position P3. Accordingly, by positioning the stage 60 at the eject position, the imaging plate 10 on the positioning surface 72CF is moved to the side of the positioning surface 72CF, and the imaging plate 10 can be easily removed from the stage 60.

The imaging plate 10 is easily removed from the stage 60 after the reading of the imaging plate 10 in order to cause the pair of positioning holders 72A, 72B (or the pair of positioning holders 72C, 72D) to perform the opening operation in accordance with the movement of the stage 60 from the reading position P2 to the setting position P1 by the stage moving mechanism 50.

Furthermore, due to the movement of at least a part of the section of the stage 60, the trigger portion 72Bq (or the roller 72Dq as the trigger portion) is brought into contact with the side plate 42 (or the actuation piece 46) to receive the force moving the stage 60. The trigger portion 72Bq (or the roller 72Dq) causes the pair of positioning holders 72A 72B (or the pair of positioning holders 72C, 72D) to perform at least one of the closing operation and the opening operation. This makes it possible to reduce the number of drive mechanisms such as the motors.

In addition, the positioning holder operating mechanism includes the biasing portion 72Bs (or the biasing portion 72Ds) that constantly applies the force in the closing direction to the pair of positioning holders 72A, 72B (or the pair of positioning holders 72C, 72D). In at least a part of the section in which the stage 60 moves from the reading position P2 to the setting position P1, the trigger portion 72Bq (or the roller 72Dq) is brought into contact with the side plate 42 (or the actuation piece 46) to cause the pair of positioning holders 72A, 72B (or the pair of positioning holders 72C, 72D) to perform the opening operation, and the pair of positioning holders 72A, 72B (or the pair of positioning holders 72C, 72D) is kept in the open state in the state in which the stage 60 is located at the setting position P1. Furthermore, in at least a part of the section in which the stage 60 moves from the setting position P1 to the reading position P2, the pair of positioning holders 72A, 72B (or the pair of positioning holders 72C, 72D) is caused to perform the closing operation by the biasing force of the biasing portion 72Bs (or the biasing portion 72Ds), and in a state in which the stage 60 is located at the reading position P2, the opposing two edge portions of the imaging plate 10 are kept tucked between the pair of positioning holders 72A, 72B (or the pair of positioning holders 72C, 72D) by the biasing force of the biasing portion 72Bs (or the biasing portion 72Ds). For this reason, the pair of positioning holders 72A, 72B (or the pair of positioning holders 72C, 72D) can be opened or closed along with the movement of the stage 60. In the state where the stage 60 is located at the reading position P2, the pair of positioning holders 72A, 72B (or the pair of positioning holders 72C, 72D) tucks in the two edge portions of the imaging plate 10 by the biasing force of the biasing portion 72Bs (or the biasing portion 72Ds), so that the imaging plate 10 can be held more reliably.

With respect to the positioning of the imaging plate 10 in the horizontal direction, the positioning holder 72B is movably supported with respect to the stage body 61 along the moving direction of the stage 60, and the trigger portion 72Bq is integrally configured with the positioning holder 72B. In at least a part of the section in which the stage 60 moves from the reading position P2 to the setting position P1, the trigger portion 72Bq comes into contact with the side plate 42, and the positioning holder 72B is moved along the moving direction of the stage 60 to operate the pair of positioning holders 72A, 72B. For this reason, the pair of positioning holders 72A, 72B can be opened and closed with a simple configuration.

With respect to the positioning of the imaging plate 10 in the vertical direction, the positioning holder 72D is movably supported with respect to the stage body 61 along the direction intersecting the moving direction of the stage 60, and the actuation piece 46 includes the inclined surface 46*g* inclined with respect to the moving direction of the stage 60. In at least a part of the section in which the stage 60 moves from the reading position P2 to the setting position P1, the roller 72Dq comes into contact with the inclined surface 46*g*, and the positioning holder 72D is moved along the direction intersecting the moving direction of the stage 60 to operate the pair of positioning holders 72C, 72D. Thus, the pair of positioning holders 72C, 72D can be operated in the direction intersecting the moving direction of the stage 60.

A roller may be provided on the side on the actuation piece 46, and an inclined surface having the same inclination as the inclined surface 46*g* may be provided in the positioning holder 72D instead of the roller. Also in this case, when the inclined surface is pressed against the roller as described above, the positioning holder 72D can move upward, and the pair of positioning holders 72C, 72D can be operated as described above.

In addition, the pair of positioning holders 72A, 72B and the pair of positioning holders 72C, 72D are included as the pair of opening and closing positioning holders, and the pair of positioning holders 72A, 72B and the pair of positioning holders 72C, 72D open and close in directions different from each other. Thus, the imaging plate 10 can be tucked in two different directions.

In addition, the supporting surface 64F is inclined with respect to the direction of gravity, and the positioning mechanism 70 includes the positioning surface 72CF that receives the lower edge of the imaging plate 10 moving downward along the supporting surface 64F as a positioning surface. For this reason, the imaging plate 10 can be easily disposed on the supporting surface 64F in the oblique posture, and the imaging plate 10 slides down on the supporting surface 64F, whereby the imaging plate 10 is easily positioned by the positioning surface 72CF.

In addition, the IP guiding surface 31GS that guides the imaging plate 10 toward the supporting surface 64F, namely, onto the supporting surface 64F is provided in the housing 30. For this reason, the imaging plate 10 is easily positioned by the positioning surface without exceeding the positioning surfaces 72AF, 72BF, 72CF, 72DF.

<Modifications of Positioning Surface>

The example in which the positioning surfaces 72AF, 72BF, 72CF, 72CF include the guide surface having the angle less than 90° with respect to the supporting surface 64F and the guide surface is the plane has been described in the above embodiment.

The positioning surface may be provided so as to protrude from the supporting surface 64F by at least the thickness dimension of the imaging plate 10, and have a shape including a guide positioning surface formed in a shape toward the direction covering the supporting surface 64F and separate from the supporting surface 64F. This shape example is illustrated in FIGS. 13 to 17.

Furthermore, the positioning surface may be formed in a shape including the guide surface in which the angle with respect to the supporting surface 64F is less than 90°, and in this case, the guide surface may not be the plane but may be the curved surface or the combination of the plane and the curved surface. When the guide surface includes the curved surface, a tangential plane of the curved surface may have an angle less than 90° with respect to the supporting surface 64F. This shape example is illustrated in FIGS. 13 to 16.

FIGS. 13 to 17 illustrate examples in which positioning surfaces 110, 111, 112, 113, 114 are formed instead of the positioning surface 72DF. The positioning surfaces 110, 111, 112, 113, 114 described above are also applicable as positioning surfaces instead of other positioning surfaces 72AF, 72BF, 72CF.

Figure 13:
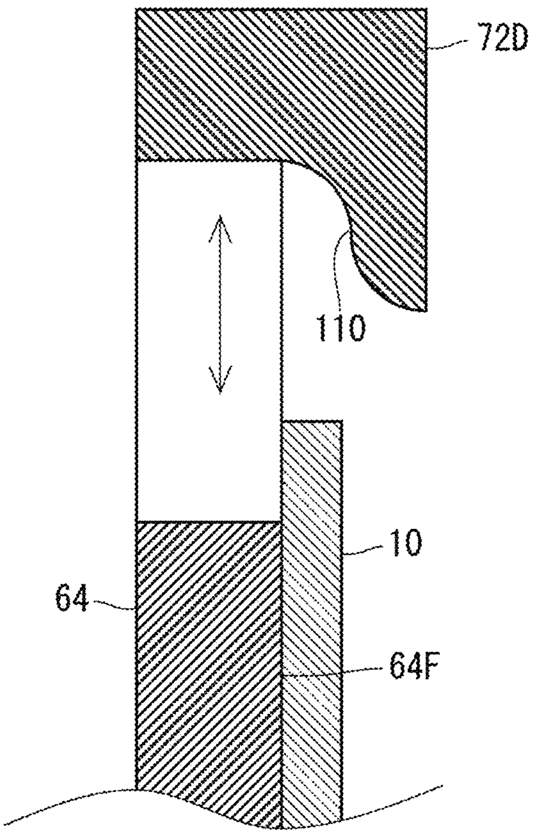
FIGS. 13, 14, 15, 16 and 17 are partially sectional views illustrating positioning surfaces according to modifications.

In the modification of FIG. 13, the positioning surface 110 is configured by a composite curved surface. When observed in a section orthogonal to the extending direction of the positioning holder 72D, a portion of the positioning surface 110 on the side closer to the supporting surface 64F forms the curved surface that is recessed and extends outward (i.e. the concave surface), and a portion of the positioning surface 110 on the side further from the supporting surface 64F forms the curved surface that protrudes and extends outward (i.e. the convex surface). That is, the curved surface in which an S-shape is inclined is formed. The angle of the positioning surface 110 with respect to the supporting surface 64F gradually decreases from the angle close to 90° to the angle close to 90° again in the range less than 90° with increasing distance from the supporting surface 64F.

In this case, as the positioning surface 110 approaches the edge portion of the imaging plate 10, the edge portion is positioned at the fixed position in the direction of the supporting surface 64F, and the edge portion is pressed against the supporting surface 64F.

Figure 14:
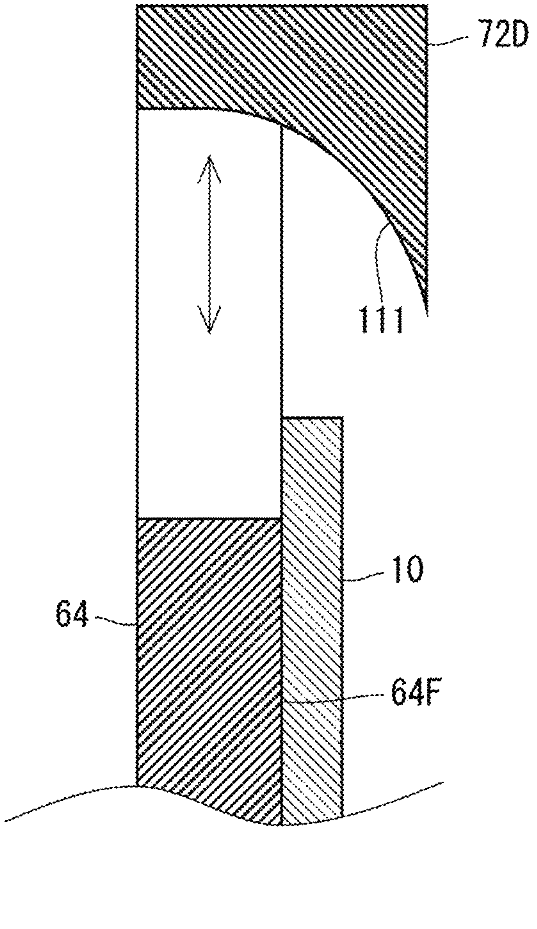

In the modification in FIG. 14, the positioning surface 111 is configured of a monotonically curved surface. When observed in the section orthogonal to the extending direction of the positioning holder 72D, the positioning surface 111 has an arcuate curved surface (i.e. the concave surface). The angle of the positioning surface 111 with respect to the supporting surface 64F gradually decreases from the angle close to 90° in the range less than 90° as the distance from the supporting surface 64F increases.

Even in this case, when the positioning surface 111 approaches the edge portion of the imaging plate 10, the edge portion is positioned at the fixed position in the direction of the supporting surface 64F, and the edge portion is pressed against the supporting surface 64F.

Figure 15:
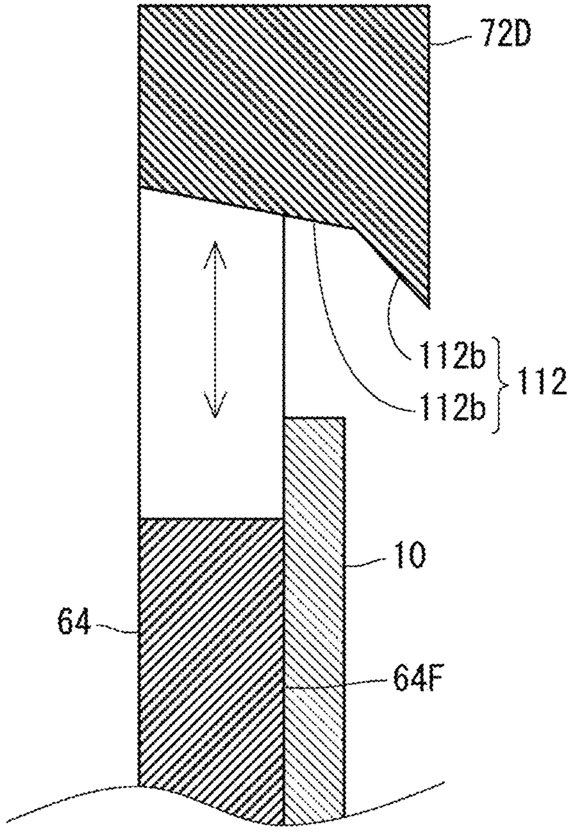

In the modification of FIG. 15, the positioning surface 112 is configured by a plurality of inclined surfaces. When observed in the section orthogonal to the extending direction of the positioning holder 72D, the portion of the positioning surface 112 closer to the supporting surface 64F forms a first slope 112*a*, and the portion of the positioning surface 112 farther from the supporting surface 64F forms a second slope 112*b*. The angle of the first slope 112*a* with respect to the supporting surface 64F is larger than the angle of the second slope 112*b* with respect to the supporting surface 64F.

Even in this case, when the positioning surface 112 approaches the edge portion of the imaging plate 10, the edge portion is positioned at the fixed position in the direction of the supporting surface 64F, and the edge portion is pressed against the supporting surface 64F.

Figure 16:
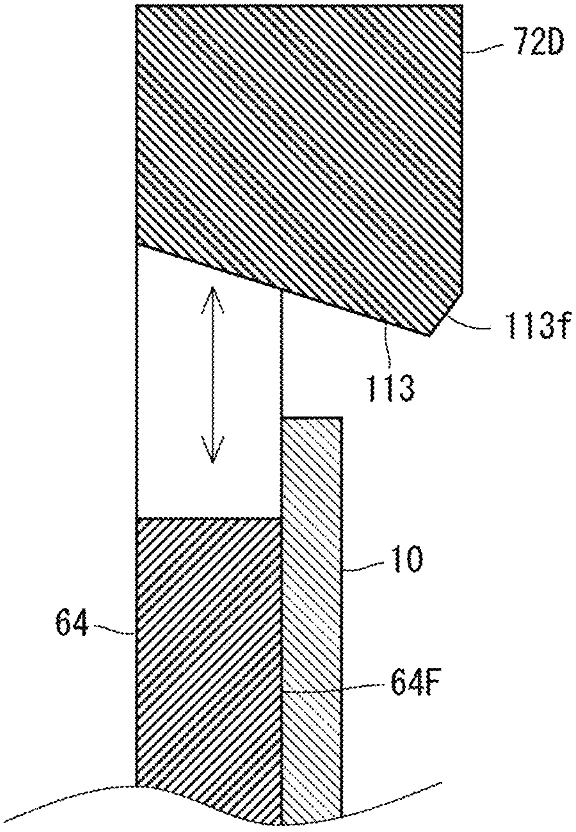

In the modification of FIG. 16, the positioning surface 113 includes a slope formed by the plane similarly to the positioning surface 72DF. A slope 113*f* forming the angle greater than or equal to 90° with respect to the supporting surface 64F is formed on the side farther from the supporting surface 64F than the positioning surface 113. In this manner, the surface forming the angle greater than or equal to 90° with respect to the supporting surface 64F may be formed on the side facing away from the supporting surface 64F with respect to the positioning surface 113.

Figure 17:
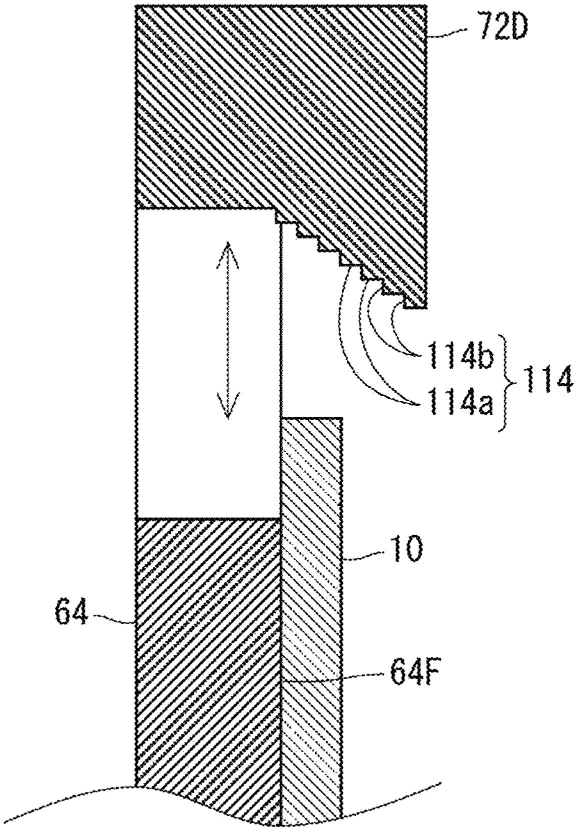

In the modification of FIG. 17, the positioning surface 114 is configured by a plurality of slopes. When observed in the section orthogonal to the extending direction of the positioning holder 72D, the positioning surface 114 has a configuration in which an orthogonal surface 114*a* orthogonal to the supporting surface 64F and a parallel surface 114*b* parallel to the supporting surface 64F are alternately formed. That is, the positioning surface 114 is formed in a shape protruding stepwise so as to cover the supporting surface 64F with increasing distance from the supporting surface 64F.

In this case, when the positioning surface 114 approaches the edge portion of the imaging plate 10, the edge portion is pressed against the positioning surface 114 while being displaced only in the direction along the supporting surface 64F with respect to the orthogonal surfaces 114*a* at a plurality of stages. Thus, it is expected that the edge portion of the imaging plate 10 is positioned while being pressed against the supporting surface 64F. In particular, when a stair width is narrow (for example, when the thickness is smaller than ½ of the thickness or the full thickness of the imaging plate 10), the edge portion of the imaging plate 10 is expected to be displaced so as to sequentially approach the side of the supporting surface 64F. Also by the positioning surface 114, the edge portion of the imaging plate 10 is positioned at the fixed position along the direction of the supporting surface 64F while being pressed against the supporting surface 64F. In addition to the stepped shape, the positioning surface may have a wavy shape (not illustrated). That is, an orthogonal surface (corresponding to 114*a*) orthogonal to the supporting surface 64F and a parallel surface (corresponding to 114*b*) parallel to the supporting surface 64F may be continuous through a curved surface. In one embodiment, a continuous curved surface that draws a continuous wave may extend in the direction covering the supporting surface 64F as a whole with increasing distance from the supporting surface 64F.

Modifications

Various directions and postures such as the moving direction of the stage 60 and the holding posture of the imaging plate 10 in the stage 60 are arbitrary in the above embodiment. For example, the stage 60 may move along the vertical direction (perpendicular direction) or a direction inclined from the vertical direction. In addition, the imaging plate 10 may be held on the stage 60 in the posture in which the longitudinal direction of the imaging plate 10 is disposed along the vertical direction (the posture in which the posture of the imaging plate 10 of the above embodiment is rotated by 90 degrees to either the left or the right). The present disclosure can be implemented not only in the embodiment of the horizontal-type scanner as illustrated in FIG. 1 but also in the embodiment of the vertical-type scanner. The supporting surface 60F of the stage 60 may be formed of a curved surface in addition to the plane. In the case where the deflection is generated in the imaging plate 10, when the supporting surface 64F is the gentle curved surface, the contact portion between the deflection of the imaging plate 10 and the curved surface of the supporting surface 64F can be increased, so that the guide to the normal position can be easily performed.

The configurations described in the above embodiment and the modifications can appropriately be combined.

The above description is illustrative in all aspects, and the present disclosure is not limited thereto. Innumerable modifications not illustrated can be envisaged without departing from the scope of the present disclosure.

Supplementary Note

The present specification and the drawings disclose the following aspects.

A first aspect is a radiation image scanner that reads a radiation image from an imaging plate, the radiation image scanner including: a stage that holds the imaging plate; an excitation light source that irradiates the imaging plate held by the stage with excitation light; and a photodetector that detects light emitted from the imaging plate by the excitation light, in which the stage includes: a stage body that includes a supporting surface capable of being brought into surface contact with a back surface of the imaging plate; and a positioning mechanism that includes a positioning surface being in contact with an edge portion of the imaging plate supported on the supporting surface and positioning the edge portion from outside along the supporting surface while pressing the edge portion against the supporting surface.

According to the first aspect, the edge portion of the imaging plate is in contact with the positioning surface, so that the imaging plate is maintained in a normal posture. Furthermore, the edge portion of the imaging plate is pressed against the supporting surface by the positioning surface. Thus, the imaging plate can be held in a normal posture while being in contact with the supporting surface.

A second aspect is the radiation image scanner according to the first aspect, in which the positioning mechanism includes a guide positioning surface as the positioning surface, the guide positioning surface being provided so as to protrude from the supporting surface by at least a thickness dimension of the imaging plate, the guide positioning surface being formed in a shape facing a direction covering the supporting surface as a distance from the supporting surface increases. In this case, because the guide positioning surface is formed so as to be directed in a direction covering the supporting surface with increasing distance from the supporting surface, the edge portion of the imaging plate is pressed against the supporting surface.

A third aspect is the radiation image scanner according to the second aspect, in which the guide positioning surface includes a guide surface having an angle less than 90° with respect to the supporting surface. In this case, the edge portion of the imaging plate is pressed against the guide surface, so that the edge portion is smoothly pressed against the supporting surface.

A fourth aspect is the radiation image scanner according to any one of the first to third aspects, in which the positioning mechanism includes a pair of opening and closing positioning holders, at least one of two opposing surfaces of the pair of opening and closing positioning holders forms at least a part of the positioning surface, and movement of at least one of the pair of opening and closing positioning holders adjusts an interval between the pair of opening and closing positioning holders.

In this case, the imaging plate can be easily disposed between the pair of opening and closing positioning holders while the pair of opening and closing positioning holders is opened. In this state, when the pair of opening and closing positioning holders is closed so as to reduce the interval between the pair of opening and closing positioning holders, the edge portions of the two opposing edge portions of the imaging plate are tucked by the two opposing surfaces of the pair of opening and closing positioning holders, and the imaging plate is maintained in the normal posture. At this time, because the guide surface guides the edge portion of the imaging plate toward the supporting surface, the imaging plate comes into contact with the supporting surface.

A fifth aspect is the radiation image scanner according to the fourth aspect, further includes: a stage moving mechanism that moves the stage between a setting position where the imaging plate is set with respect to the stage and a reading position where the photodetector reads the radiation image according to the excitation light from the excitation light source; and a positioning holder operating mechanism that closes the pair of opening and closing positioning holders in accordance with movement of the stage from the setting position to the reading position by the stage moving mechanism. In this case, at the setting position, the pair of opening and closing positioning holders can be opened to easily set the imaging plate. After setting the imaging plate, the stage is moved to the reading position, so that the imaging plate can be stably held even when a part of the device moves in a normal posture while being in contact with the supporting surface.

A sixth aspect is the radiation image scanner according to the fifth aspect, in which the pair of opening and closing positioning holders includes a displacing positioning holder that moves between a contact position where the positioning surface faces to the edge portion of the imaging plate on the supporting surface and a retreat position where the positioning surface is retreated from the edge portion of the imaging plate on the supporting surface. Thus, the positioning surface is moved to the retreat position, and the imaging plate can be easily removed from the stage.

A seventh aspect is the radiation image scanner according to the sixth aspect, in which the stage moving mechanism moves the stage to an eject position farther from the reading position than the setting position, and the displacing positioning holder is maintained at the contact position in a state where the stage is located between the setting position and the reading position, and moves to the retreat position in a state where the stage is located at the eject position. Thus, by positioning the stage at the eject position, the imaging plate on the positioning surface can be moved to the displacing positioning holder side, and the imaging plate can be easily removed from the stage.

An eighth aspect is the radiation image scanner according to any one of the fifth to seventh aspects, in which the positioning holder operating mechanism causes the pair of opening and closing positioning holders to perform an opening operation in accordance with the movement of the stage from the reading position to the setting position by the stage moving mechanism. In this case, when the imaging plate moves from the reading position to the setting position after reading of the imaging plate, the pair of opening and closing positioning holders is opened. Thus, the imaging plate is easily removed from the stage.

A ninth aspect is the radiation image scanner according to any one of the fifth to eighth aspects, further includes a fixed disposition portion disposed at a fixed position during the movement of the stage, in which the positioning holder operating mechanism includes a trigger portion that is brought into contact with the fixed disposition portion by the movement of at least a part of a section of the stage such that the trigger portion receives a force with which the stage moving mechanism moves the stage, and the trigger portion receives the force with which the stage moving mechanism moves the stage to perform at least one of the closing operation and the opening operation of the pair of opening and closing positioning holders. As a result, at least one of the closing operation and the opening operation of the pair of opening and closing positioning holders can be performed by the force of the stage moving mechanism moving the stage, and the drive mechanism such as the motor can be reduced.

A tenth aspect is the radiation image scanner according to the ninth aspect, in which the positioning holder operating mechanism includes a biasing portion that constantly applies a biasing force in a closing direction to the pair of opening and closing positioning holders, and the trigger portion is in contact with the fixed disposition portion to open the pair of opening and closing positioning holders in at least the part of the section in which the stage moves from the reading position to the setting position, maintains the pair of opening and closing positioning holders in the open state in a state in which the stage is located at the setting position, closes the pair of opening and closing positioning holders by biasing force of the biasing portion in at least the part of the section in which the stage moves from the setting position to the reading position, and maintains a state in which edge portions at two opposing positions of the imaging plate are tucked by the pair of opening and closing positioning holders by the biasing force of the biasing portion in a state in which the stage is located at the reading position.

Thus, the pair of opening and closing positioning holders can be opened and closed along with the movement of the stage. In the state where the stage is located at the reading position, the pair of opening and closing positioning holders tucks the two edge portions of the imaging plate by the biasing force of the biasing portion, whereby the imaging plate can be more reliably held.

An eleventh aspect is the radiation image scanner according to the ninth or tenth aspect, in which the pair of opening and closing positioning holders includes a first movable positioning holder movably supported with respect to the stage body along a moving direction of the stage, the trigger portion is formed integrally with the first movable positioning holder, and in at least the part of the section in which the stage moves from the reading position to the setting position, the trigger portion is in contact with the fixed disposition portion, and the first movable positioning holder is moved along the moving direction of the stage to operate the pair of opening and closing positioning holders. Thus, the pair of opening and closing positioning holders can be opened and closed in the moving direction of the stage.

A twelfth aspect is the radiation image scanner according to any one of the ninth to eleventh aspects, in which the pair of opening and closing positioning holders includes a second movable positioning holder movably supported with respect to the stage body along a direction intersecting a moving direction of the stage, one of the trigger portion and the fixed disposition portion includes an inclined surface inclined with respect to the moving direction of the stage, the other of the trigger portion and the fixed disposition portion includes a roller movable along the inclined surface, and in at least the part of the section in which the stage moves from the reading position to the setting position, the roller is brought into contact with the inclined surface to move the second movable positioning holder along a direction intersecting the moving direction of the stage to operate the pair of opening and closing positioning holders. Thus, the pair of opening and closing positioning holders can be opened and closed in the direction intersecting the moving direction of the stage.

A thirteenth aspect is the radiation image scanner according to any one of the fourth to twelfth aspects, in which the positioning mechanism includes a pair of first opening and closing positioning holders and a pair of second opening and closing positioning holders as the pair of opening and closing positioning holders, and the pair of first opening and closing positioning holders and the pair of second opening and closing positioning holders are opened and closed in directions different from each other. Thus, the imaging plate can be tucked in two different directions.

A fourteenth aspect is the radiation image scanner according to any one of the first to thirteenth aspects, in which the supporting surface is inclined with respect to a gravity direction, and the positioning mechanism includes a surface that receives a lower edge portion of the imaging plate moving downward along the supporting surface as the positioning surface. Thus, the imaging plate can be easily disposed on the supporting surface in the oblique posture, and the imaging plate is easily positioned by the positioning surface by sliding down on the supporting surface.

A fifteenth aspect is the radiation image scanner according to any one of the first to fourteenth aspects further includes a housing that accommodates the stage, the excitation light source, and the photodetector, in which an IP guiding surface that guides the imaging plate toward the supporting surface is provided in the housing. In this case, the imaging plate is easily positioned by the positioning surface without exceeding the positioning surface.

While the disclosure has been shown and described in detail, the foregoing description is in all aspects illustrative and not restrictive. It is therefore understood that numerous modifications and variations can be devised without departing from the scope of the disclosure.

What is claimed is:

1. A radiation image scanner that reads a radiation image from an imaging plate, the radiation image scanner comprising:

a stage that holds the imaging plate;

an excitation light source that irradiates the imaging plate held by the stage with excitation light; and a photodetector that detects light emitted from the imaging plate based on the excitation light, wherein the stage includes a stage body that includes a supporting surface in surface contact with a back surface of the imaging plate, and a positioning mechanism that includes a positioning surface in contact with an edge portion of the imaging plate supported on the supporting surface and positioning the edge portion from outside along the supporting surface while pressing the edge portion against the supporting surface, wherein the positioning mechanism includes a pair of opening and closing positioning holders, at least one of two opposing surfaces of the pair of opening and closing positioning holders forms at least a part of the positioning surface, and movement of at least one of the pair of opening and closing positioning holders adjusts an interval between the pair of opening and closing positioning holders, and wherein the radiation image scanner further comprises:

a stage moving mechanism that moves the stage between a setting position where the imaging plate is set with respect to the stage and a reading position where the photodetector reads the radiation image according to the excitation light from the excitation light source; and a positioning holder operating mechanism that closes the pair of opening and closing positioning holders in accordance with movement of the stage from the setting position to the reading position by the stage moving mechanism.

2. The radiation image scanner according to claim 1, wherein the positioning mechanism includes a guide positioning surface as the positioning surface, the guide positioning surface being provided to protrude from the supporting surface by at least a thickness dimension of the imaging plate, the guide positioning surface being formed in a shape facing the supporting surface and covering the supporting surface as a distance from the supporting surface increases.

3. The radiation image scanner according to claim 2, wherein the guide positioning surface includes a guide surface having an angle of less than 90° with respect to the supporting surface.

4. The radiation image scanner according to claim 1, wherein the pair of opening and closing positioning holders includes a displacing positioning holder that moves between a contact position where the positioning surface faces the edge portion of the imaging plate on the supporting surface and a retreat position where the positioning surface is withdrawn from the edge portion of the imaging plate on the supporting surface.

5. The radiation image scanner according to claim 4, wherein the stage moving mechanism moves the stage to an eject position farther from the reading position than the setting position, and the displacing positioning holder is maintained at the contact position when the stage is located between the setting position and the reading position and moves to the retreat position when the stage is located at the eject position.

6. The radiation image scanner according to claim 1, wherein the positioning holder operating mechanism causes the pair of opening and closing positioning holders to open in accordance with the movement of the stage from the reading position to the setting position by the stage moving mechanism.

7. The radiation image scanner according to claim 1, further comprising a fixed disposition portion arranged at a fixed position during the movement of the stage, wherein the positioning holder operating mechanism includes a trigger portion that is brought into contact with the fixed disposition portion by the movement of at least a part of the stage such that the trigger portion receives a force with which the stage moving mechanism moves the stage, and the trigger portion receives the force with which the stage moving mechanism moves the stage to perform at least one of a closing operation and an opening operation of the pair of opening and closing positioning holders.

8. The radiation image scanner according to claim 7, wherein the positioning holder operating mechanism includes a biasing portion that constantly applies a biasing force in a closing direction to the pair of opening and closing positioning holders, and the trigger portion is in contact with the fixed disposition portion to open the pair of opening and closing positioning holders when the stage moves from the reading position to the setting position, maintains the pair of opening and closing positioning holders in an open state when the stage is located at the setting position, closes the pair of opening and closing positioning holders by the biasing force of the biasing portion when the stage moves from the setting position to the reading position, and maintains a state in which edge portions at two opposing sides of the imaging plate are sandwiched by the pair of opening and closing positioning holders by the biasing force of the biasing portion when the stage is located at the reading position.

9. The radiation image scanner according to claim 7, wherein the pair of opening and closing positioning holders includes a first movable positioning holder movably supported with respect to the stage body along a moving direction of the stage, the trigger portion is formed integrally with the first movable positioning holder, and when the stage moves from the reading position to the setting position, the trigger portion is in contact with the fixed disposition portion, and the first movable positioning holder moves along the moving direction of the stage to operate the pair of opening and closing positioning holders.

10. The radiation image scanner according to claim 7, wherein the pair of opening and closing positioning holders includes a second movable positioning holder movably supported with respect to the stage body along a direction intersecting a moving direction of the stage, one of the trigger portion and the fixed disposition portion includes an inclined surface inclined with respect to the moving direction of the stage, the other of the trigger portion and the fixed disposition portion includes a roller movable along the inclined surface, and when the stage moves from the reading position to the setting position, the roller is brought into contact with the inclined surface to move the second movable positioning holder along a direction intersecting the moving direction of the stage to operate the pair of opening and closing positioning holders.

11. The radiation image scanner according to claim 1, wherein the positioning mechanism includes a pair of first opening and closing positioning holders and a pair of second opening and closing positioning holders as the pair of opening and closing positioning holders, and the pair of first opening and closing positioning holders and the pair of second opening and closing positioning holders are opened and closed in directions different from each other.

12. The radiation image scanner according to claim 1, wherein the supporting surface is inclined with respect to a gravity direction, and the positioning mechanism includes a surface that receives a lower edge portion of the imaging plate moving downward along the supporting surface as the positioning surface.

13. The radiation image scanner according to claim 1, further comprising a housing that accommodates the stage, the excitation light source, and the photodetector, wherein an imaging plate guiding surface that guides the imaging plate toward the supporting surface is provided in the housing.

14. The radiation image scanner according to claim 1, wherein the positioning surface includes a curved surface.

15. The radiation image scanner according to claim 1, further comprising a stage moving mechanism configured to move the stage in a first moving direction, wherein the excitation light is configured to move in a second moving direction to irradiate the imaging plate, the second moving direction being orthogonal to the first moving direction.

16. The radiation image scanner according to claim 1, wherein the positioning mechanism includes a first positioning surface orthogonal to a second positioning surface.

17. The radiation image scanner according to claim 1, wherein the positioning mechanism includes a first positioning surface and a second positioning surface, and wherein the first positioning surface and the second positioning surface are inclined towards each other such that a distance between a first end of the first positioning surface and a first end of the second positioning surface is smaller than a distance between an opposing end of the first positioning surface and an opposing end of the second positioning surface.

18. A radiation image scanner that reads a radiation image from an imaging plate, the radiation image scanner comprising:

a stage that holds the imaging plate;

an excitation light source that irradiates the imaging plate held by the stage with excitation light; and a photodetector that detects light emitted from the imaging plate based on the excitation light, wherein the stage includes a stage body that includes a supporting surface in surface contact with a back surface of the imaging plate, and a positioning mechanism that includes a positioning surface in contact with an edge portion of the imaging plate supported on the supporting surface and positioning the edge portion from outside along the supporting surface while pressing the edge portion against the supporting surface, the supporting surface is flat, and in a state in which the imaging plate is supported on the supporting surface, the imaging plate is irradiated with excitation light from the excitation light source and the photodetector detects emission light from the imaging plate excited by the excitation light.

19. The radiation image scanner according to claim 18, wherein the positioning surface is provided to protrude from the supporting surface by at least a thickness dimension of the imaging plate to a front side of the supporting surface and a guide positioning surface is formed in a shape facing the supporting surface and covering the supporting surface as a distance from the supporting surface increases.

20. The radiation image scanner according to claim 18, wherein the positioning mechanism includes a first positioning surface intersecting a second positioning surface when viewed in a direction orthogonal to the supporting surface.

* * * * *